(12) United States Patent
Zhou et al.

(10) Patent No.: US 12,018,221 B2
(45) Date of Patent: Jun. 25, 2024

(54) SYNTHETIC FUELS, AND METHODS AND APPARATUS FOR PRODUCTION THEREOF

(71) Applicant: Air Company Holdings, Inc., Brooklyn, NY (US)

(72) Inventors: Lubo Zhou, Deer Park, IL (US); Chi Chen, Shrewsbury, MA (US); Qiyuan Wu, Jersey City, NJ (US); Stafford W. Sheehan, Tiverton, RI (US); Namal de Silva, New York, NY (US); Mahluli Moyo, New York, NY (US); Jihad Dakka, Whitehouse Station, NJ (US); David DeVilliers, Katy, TX (US); Gregory Constantine, New York, NY (US); Mark Rumizen, Reading, MA (US)

(73) Assignee: Air Company Holdings, Inc., Brooklyn, NY (US)

( * ) Notice: Subject to any disclaimer, the term of this patent is extended or adjusted under 35 U.S.C. 154(b) by 0 days.

(21) Appl. No.: 18/514,569

(22) Filed: Nov. 20, 2023

(65) Prior Publication Data

US 2024/0124792 A1    Apr. 18, 2024

Related U.S. Application Data

(63) Continuation of application No. PCT/US2023/033544, filed on Sep. 22, 2023.
(Continued)

(51) Int. Cl.
*C10L 1/06*      (2006.01)
*C10G 5/00*      (2006.01)
*C10G 45/54*     (2006.01)

(52) U.S. Cl.
CPC .................. *C10L 1/06* (2013.01); *C10G 5/00* (2013.01); *C10G 45/54* (2013.01);
(Continued)

(58) Field of Classification Search
CPC .. C10G 5/00; C10G 45/54; C10G 2300/1096; C10G 2400/08; C10L 1/06; C10L 2270/04
See application file for complete search history.

(56) References Cited

U.S. PATENT DOCUMENTS

| 719,623 A | 2/1903 | Spohn |
| 1,873,536 A | 8/1932 | Brown et al. |

(Continued)

FOREIGN PATENT DOCUMENTS

| CA | 2496839 A1 | 1/2006 |
| CN | 114939433 A | 8/2022 |

(Continued)

OTHER PUBLICATIONS

International Search Report and Written Opinion for International Application No. PCT/US23/10444 dated Apr. 13, 2023.
(Continued)

*Primary Examiner* — Brian A McCaig
(74) *Attorney, Agent, or Firm* — Foley Hoag LLP; Lucas P. Watkins; Benjamin A. Vaughan

(57) ABSTRACT

Provided herein are systems and methods for converting $CO_2$ and a reduction gas such as $H_2$ or a hydrocarbon to mixtures of paraffins and aromatics suitable for use as aviation fuel.

20 Claims, 7 Drawing Sheets

Related U.S. Application Data

(60) Provisional application No. 63/527,713, filed on Jul. 19, 2023, provisional application No. 63/409,110, filed on Sep. 22, 2022.

(52) U.S. Cl.
CPC . *C10G 2300/1096* (2013.01); *C10G 2400/08* (2013.01); *C10L 2270/04* (2013.01)

(56) References Cited

U.S. PATENT DOCUMENTS

| | | | |
|---|---|---|---|
| 3,452,106 | A | 6/1969 | Sato et al. |
| 4,482,767 | A | 11/1984 | Imai |
| 4,499,327 | A | 2/1985 | Kaiser |
| 5,126,308 | A | 6/1992 | Barger et al. |
| 5,714,662 | A | 2/1998 | Vora et al. |
| 8,436,215 | B2 | 5/2013 | Chornet et al. |
| 8,779,215 | B2 | 7/2014 | Kharas |
| 10,464,859 | B2 | 11/2019 | Ge et al. |
| 10,472,573 | B2 | 11/2019 | Ge et al. |
| 2003/0220531 | A1 | 11/2003 | Cortright et al. |
| 2005/0107481 | A1 | 5/2005 | Janssen et al. |
| 2011/0105630 | A1 | 5/2011 | Dorner et al. |
| 2012/0209037 | A1 * | 8/2012 | Viljoen .................. C10G 45/00 585/350 |
| 2013/0030224 | A1 | 1/2013 | Kim et al. |
| 2014/0051897 | A1 | 2/2014 | Peters et al. |
| 2015/0175505 | A1 | 6/2015 | Glover et al. |
| 2015/0247100 | A1 | 9/2015 | Bradin |
| 2016/0038919 | A1 | 2/2016 | Landau et al. |
| 2018/0362426 | A1 | 12/2018 | Chen et al. |
| 2019/0071374 | A1 | 3/2019 | Ge et al. |
| 2019/0194559 | A1 | 6/2019 | Mdleleni et al. |
| 2021/0147326 | A1 | 5/2021 | Sheehan |
| 2022/0184586 | A1 | 6/2022 | Yao et al. |
| 2023/0060945 | A1 | 3/2023 | Sheehan |
| 2023/0069964 | A1 | 3/2023 | Littlewood et al. |
| 2023/0348347 | A1 | 11/2023 | Sheehan et al. |
| 2023/0390744 | A1 | 12/2023 | Sheehan et al. |

FOREIGN PATENT DOCUMENTS

| | | | |
|---|---|---|---|
| EP | 0096996 A2 | 12/1983 | |
| EP | 0269297 A1 * | 6/1988 | ............. C07C 15/00 |
| WO | WO-2019/010095 A1 | 1/2019 | |
| WO | WO-2021/262922 A1 | 12/2021 | |
| WO | WO-2022008534 A1 * | 1/2022 | ................ C10L 1/02 |
| WO | WO-2022/245944 A1 | 11/2022 | |
| WO | WO-2023/137002 A1 | 7/2023 | |

OTHER PUBLICATIONS

U.S. Appl. No. 18/366,901, pending.
Chen et al., "Single-Step Production of Alcohols and Paraffins from $CO_2$ and $H_2$ at Metric Ton Scale," ACS Energy Letters, 7: pp. 988-992 (2022).
International Search Report and Written Opinion for International Application No. PCT/US2023/033547 dated Dec. 4, 2023.
International Search Report and Written Opinion of the International Searching Authority, PCT International Patent application No. PCT/US2022/029834, dated Oct. 11, 2022, 24 pages.
Liang et al., "Direct conversion of $CO_2$ to aromatics over K—Zn—Fe/ZSM-5 catalysts via a Fischer-Tropsch synthesis pathway." *Industrial & Engineering Chemistry Research* 61.29:10336-10346 (2022).
International Search Report and Written Opinion for International Application No. PCT/US2023/033544 dated Jan. 2, 2024.
Zhou et al., "Direct carbon dioxide hydrogenation to produce bulk chemicals and liquid fuels via heterogeneous catalysis." Chinese Journal of Catalysis 43(8) (2022): 2045-2056.

* cited by examiner

SYNTHETIC FUELS, AND METHODS AND APPARATUS FOR PRODUCTION THEREOF

CROSS REFERENCE TO RELATED APPLICATIONS

This application is a Continuation of International Patent Application No. PCT/US23/33544, filed Sep. 22, 2023; which claims the benefit of priority to U.S. Provisional Patent Application 63/409,110, filed Sep. 22, 2022; and U.S. Provisional Patent Application 63/527,713, filed Jul. 19, 2023; the entire contents of each of which are incorporated herein by reference.

BACKGROUND

As the concentration of carbon dioxide in the atmosphere increases, it is advantageous to develop technologies that remove or mitigate carbon dioxide emissions. As such, development of transportation technologies that afford decreased $CO_2$ emissions, such as electric cars, has been a priority. However, the development of electric airplanes, especially commercial electric airplanes, is problematic due to low energy density of the batteries required. Therefore, a need remains for the development of sustainable aviation fuel (SAF), and currently available technologies will not be able to meet market demand.

Currently, jet fuel (Jet-A) consists of normal paraffins, iso-paraffins, naphthenes, and aromatics refined from crude oil. In order to produce SAF that can be directly substituted for Jet-A, the SAF has to match the current composition of Jet-A derived from crude oil. Current technologies for SAF production involve making SAF from vegetable oils, animal fats, and waste oils. However, the SAF made from these processes contains mainly paraffins, and does not have enough naphthenes and aromatics to be directly substituted for Jet-A derived from crude oil. Accordingly, there is a need for technologies that produce SAF that can be directly substituted for Jet-A derived from crude oil.

SUMMARY OF THE INVENTION

In certain aspects, provided herein are systems for the production of aviation fuel comprising:
 a first reduction gas feed [10];
 a first carbon source feed [11];
 a paraffin reactor [25] comprising a paraffin catalyst, said paraffin reactor having a first reduction gas feed inlet [23], a first carbon source inlet [23], and a paraffin product outlet [27], wherein the first reduction gas feed is coupled to the first reduction gas feed inlet, and the first carbon source feed is coupled to the first carbon source feed inlet;
 a second reduction gas feed [10];
 a second carbon source feed [11];
 an aromatic reactor [31] comprising an aromatic catalyst, said aromatic reactor having a second reduction gas feed inlet [37], a second carbon source inlet [37], and an aromatic product outlet [33], wherein the second reduction gas feed is coupled to the second reduction gas feed inlet, and the second carbon source feed is coupled to the second carbon source feed inlet; and
 a blender having a paraffin product inlet [28], an aromatic product inlet [35], and a blended product outlet [39], wherein the paraffin product outlet from the paraffin reactor is coupled to the paraffin product inlet of the blender, and the aromatic product outlet from the paraffin reactor is coupled to the aromatic product inlet of the blender.

In certain embodiments, the systems further comprise a high pressure separator [40] having a blended product inlet [39], optionally an HP recycle gas outlet [41], and an HP separated product outlet [45], wherein the blended product outlet of the blender is coupled to the blended product inlet of the high pressure separator.

In further embodiments, the systems further comprise a low pressure separator [46] having an HP separated product inlet [45], optionally an LP recycle gas outlet [47], and an LP separated product outlet [53], wherein the HP separated product outlet of the high pressure separator is coupled to the HP separated product inlet of the low pressure separator.

In still further embodiments, the systems further comprise a first separator [57] having an LP separated product inlet [56], a $C_{1-4}$ hydrocarbon outlet [58], and a $C_{5+}$ hydrocarbon outlet [59], wherein the LP separated product outlet of the low pressure separator is coupled to the LP separated product inlet of the first separator.

In certain embodiments, the systems further comprise a second separator [60] having a $C_{5+}$ hydrocarbon inlet [59], a $C_{5-8}$ hydrocarbon outlet [62], a $C_{16+}$ hydrocarbon outlet [61], and a $C_{9-15}$ hydrocarbon outlet [63], wherein the $C_{5+}$ hydrocarbon outlet of the first separator is coupled to the $C_{5+}$ hydrocarbon inlet of the second separator.

In further embodiments, the systems further comprise:
 a third reduction gas feed [5]; and
 an isomerization reactor [64] comprising an isomerization catalyst, said isomerization reactor having a third reduction gas feed inlet [not shown], a $C_{9-15}$ hydrocarbon inlet [63], and an isomerized product outlet [65], wherein the third reduction gas feed is coupled to the third reduction gas feed inlet, and the $C_{9-15}$ hydrocarbon outlet of the second separator is coupled to the $C_{9-15}$ hydrocarbon inlet of the isomerization reactor.

In yet further embodiments, the systems further comprise a third separator [66] having an isomerized product inlet [65], a first recycle gas outlet [75], a $C_{16+}$ hydrocarbon outlet [68], and a purified aviation fuel outlet [67], wherein the isomerized product outlet of the isomerization reactor is coupled to the isomerized product inlet of the third separator.

In further aspects, provided herein are methods for the conversion of carbon source gases and reduction gases to aviation fuel, said methods comprising:
 contacting a first reduction gas and a first carbon source gas with a paraffin catalyst to afford a paraffin product mixture comprising one or more paraffins;
 contacting a second reduction gas and a second carbon source gas with an aromatic catalyst to afford an aromatic product mixture comprising one or more aromatics and/or cyclic paraffins;
 blending the paraffin product mixture and the aromatic product mixture to afford a crude product mixture.

In certain embodiments, the methods further comprise a first separation step, wherein the first separation comprises separating the degassed crude product mixture into:
 a first low carbon fraction comprising the $C_{1-4}$ hydrocarbons; and
 a first high carbon fraction comprising the $C_{5-8}$ hydrocarbons, the $C_{9-15}$ hydrocarbons, and the $C_{16+}$ hydrocarbons.

In further embodiments, the methods further comprise a second separation step, wherein the second separation comprises separating the first high carbon fraction into:

a second low carbon fraction comprising the $C_{5-8}$ hydrocarbons;

the purified product mixture comprising the $C_{9-15}$ hydrocarbons; and a second high carbon fraction comprising the $C_{16+}$ hydrocarbons.

In certain embodiments, the methods further comprise contacting the purified product mixture and a third reduction gas with an isomerization catalyst to afford an isomerized product mixture comprising:

additional $C_{1-8}$ hydrocarbons;

additional $C_{9-15}$ hydrocarbons including linear paraffins, branched paraffins, cyclic paraffins, aromatics, and naphthenes; and additional $C_{16+}$ hydrocarbons.

In certain embodiments, the methods further comprise a third separation, wherein the third separation comprises separating the isomerized product mixture into:

a first recycle gas mixture comprising the additional $C_{1-8}$ hydrocarbons;

a third high carbon fraction comprising the additional $C_{16+}$ hydrocarbons; and purified aviation fuel comprising the additional $C_{9-15}$ hydrocarbons including linear paraffins, branched paraffins, cyclic paraffins, aromatics, and naphthenes.

In certain aspects, provided herein are fuel compositions comprising:

DETAILED DESCRIPTION OF THE INVENTION

Figure 1:
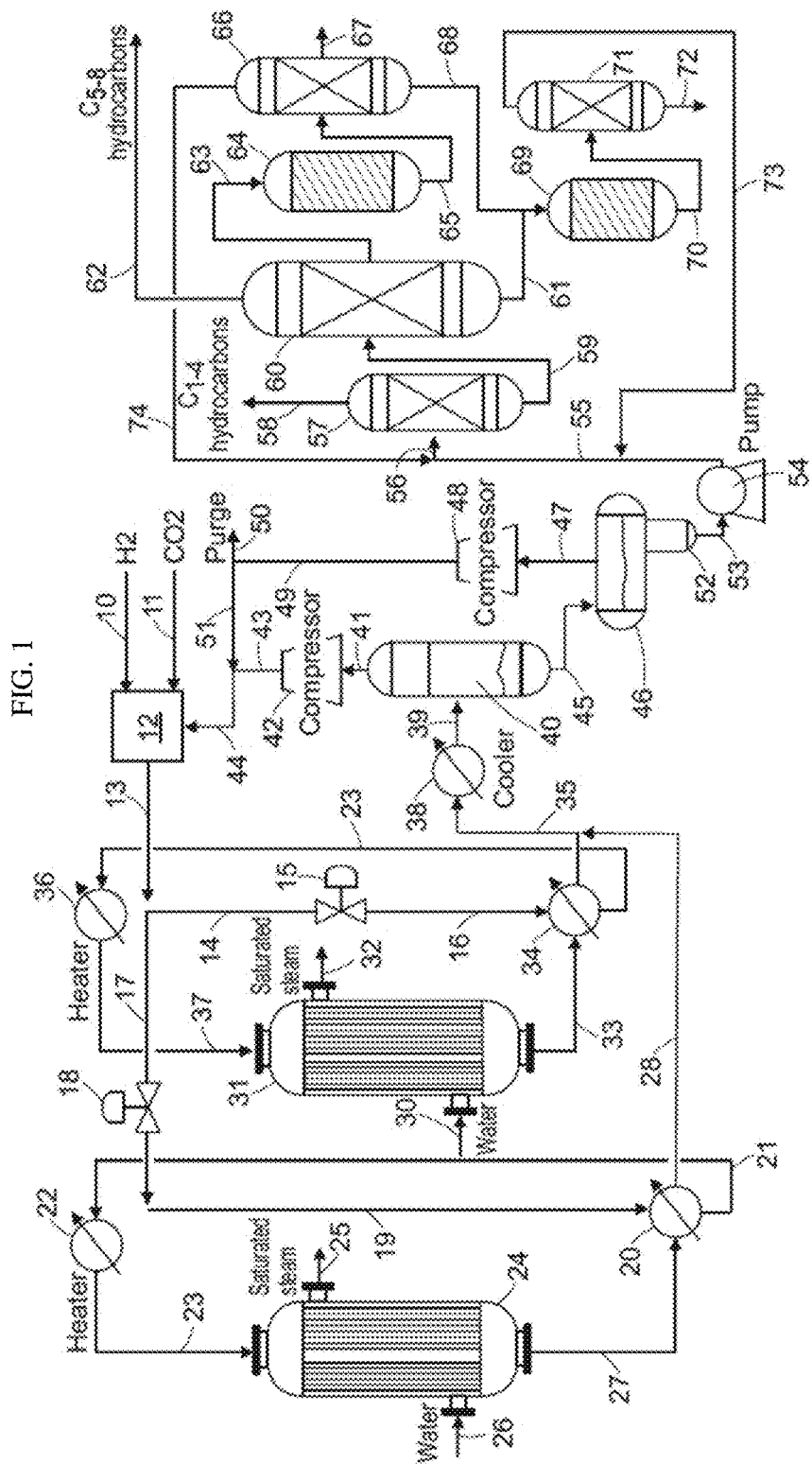
FIG. 1 shows an exemplary process flow diagram for the production of SAF that can be directly substituted for Jet-A derived from crude oil, made from $CO_2$ and reduction gas.
Figure 2:
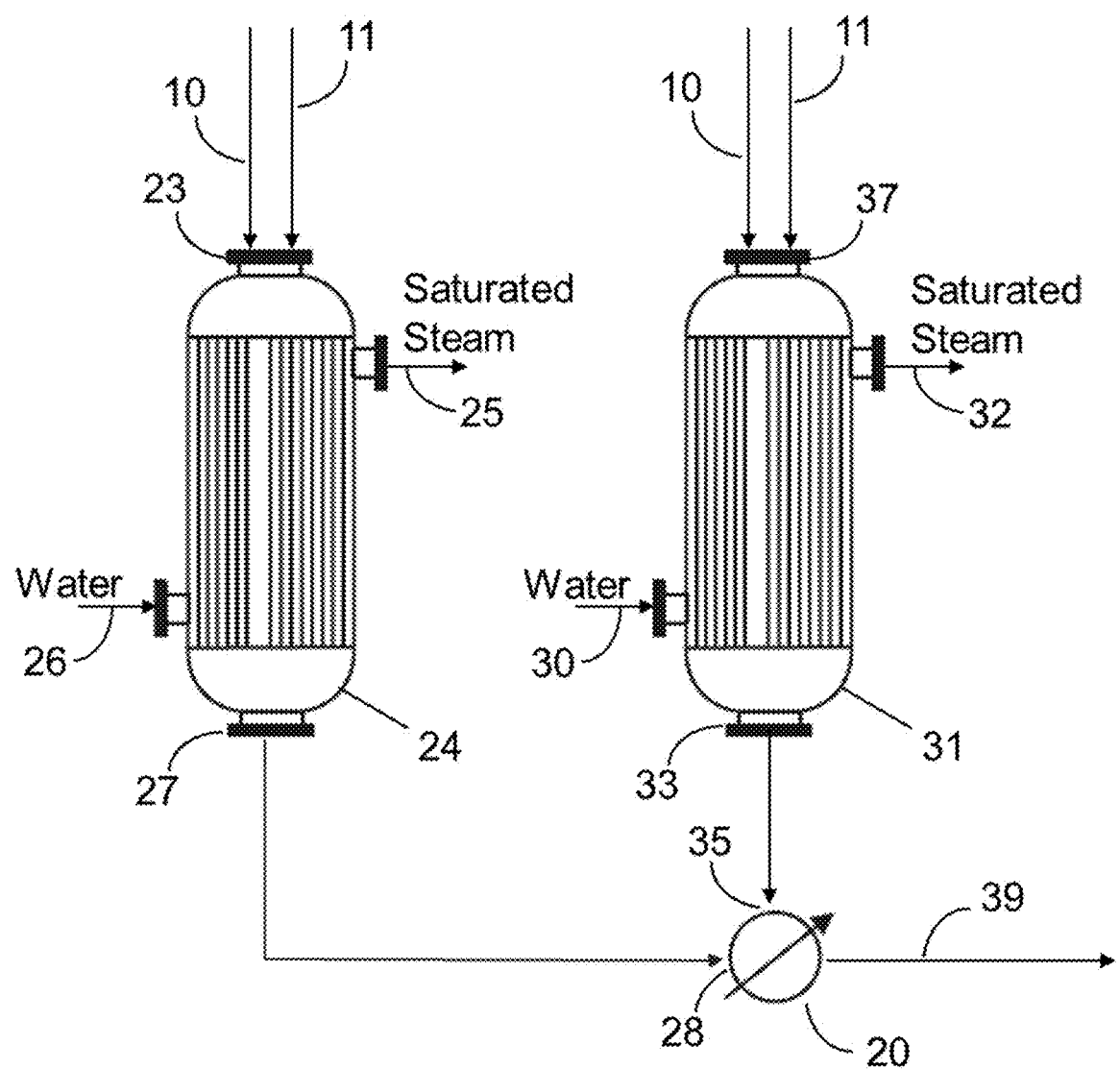
FIG. 2 shows an exemplary process flow diagram for the production of fuels from a reduction gas (e.g., $H_2$) and a carbon source gas (e.g., $CO_2$).
Figure 3:
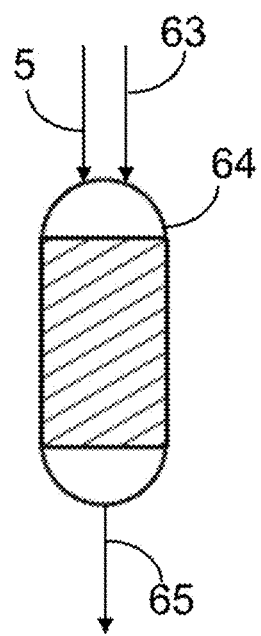
FIG. 3 shows an exemplary isomerization reactor [64] having a third reduction gas feed inlet [5], a $C_{9-15}$ hydrocarbon inlet [63], and an isomerized product outlet [65].
Figure 4:
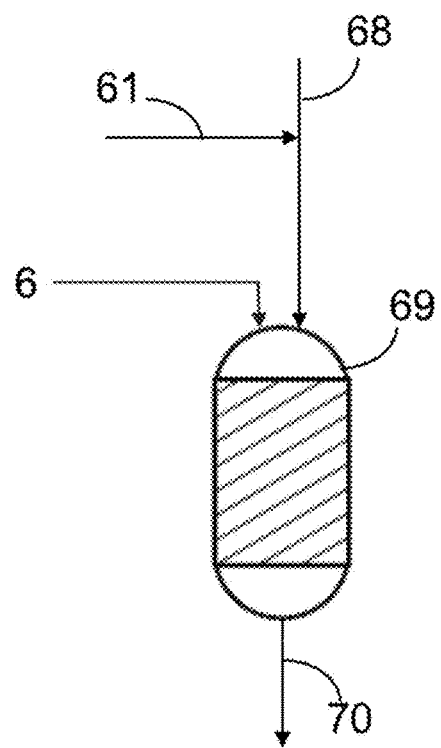
FIG. 4 shows an exemplary hydrocracking reactor [69] having a fourth reduction gas feed inlet [6] a first $C_{16+}$ hydrocarbon inlet [61], a second $C_{16+}$ hydrocarbon inlet [68], and a hydrocracked product outlet [70].

Aviation fuel generally comprises four classes of hydrocarbon compounds: normal (linear) paraffins, isoparaffins (branched), cycloparaffins, and aromatics. The most commonly used Jet A and Jet A-1 fuels are blended to have a composition that enables them to meet specifications defined by ASTM International (formerly the American Society of Testing and Materials) Standard D1655. The ASTM D1655 standard specification for aviation turbine fuels includes physical and chemical property tests that must be met for Jet A or Jet A-1 to be used in aircraft. That standard also includes limits for the concentration of acidic and sulfur-containing compounds, as well as a minimum and maximum concentration for aromatic hydrocarbons, and refers to ASTM standard tests for those limits. Aromatics are required for material compatibility with O-rings in existing turbine engines but are missing in most synthetically produced blend components for aviation fuel.

Among aromatic hydrocarbons, monocyclic aromatics and bicyclic aromatic compounds (meaning compounds that contain two fused aromatic rings) do not substantially differ in their effectiveness for O-ring compatibility, and petroleum-derived jet fuels typically contain both. ASTM D1655 also does not differentiate between them. However, polycyclic aromatics (meaning compounds that contain two or more fused aromatic rings), e.g., naphthalenes, produce a considerably larger amount of hazardous particulate emissions upon combustion than their monocyclic counterparts. For example, n-butylbenzene produces around 62% of the soot of naphthalene when burned. Thus, it is advantageous for synthetic Jet A to contain monocyclic aromatics rather than polycyclic aromatics.

Among the processes that synthesize synthetic blend components for sustainable aviation fuel, Fischer-Tropsch (FT) is commonly used, as it is a proven process that has been in operation since the early 1900s for the conversion of synthesis gas (syngas), a mixture of carbon monoxide and hydrogen gas, into paraffins. The product liquid from FT, Fischer-Tropsch Hydroprocessed Synthesized Paraffinic Kerosene (FT-SPK) was the subject of Annex A1 of ASTM D7566, the first approved annex for a synthetic blend component for SAF. This paraffinic kerosene is comprised primarily of n-paraffins and isoparaffins, with little or no cycloparaffins or aromatics. For this reason, FT-SPK must be blended with a corresponding traditional Jet A to achieve the desired concentration of cyclic compounds to meet ASTM D1655 specifications. Through the ASTM D4054 process, additional annexes to ASTM D7566 have been approved for synthetic blend components that contribute to a fully formulated Jet A.

In certain aspects, the present disclosure describes a fully formulated Jet A made synthetically from carbon dioxide. As described herein, the production process assembles aromatic compounds from carbon dioxide. This bottom-up process design substantially reduces the synthetic accessibility of larger molecules. The synthetic Jet A disclosed in the present invention thus contains fewer polycyclic aromatics than Jet A made from petroleum-derived components. In certain embodiments, the synthetic Jet A of the present disclosure comprises less than about 1 wt % polycyclic aromatics.

The compositions described herein also contain substantially fewer sulfur-containing species than the comparable fossil fuel, in certain embodiments less than 1 ppm. This is accomplished by synthesizing the jet fuel thermochemically from $CO_2$ and $H_2$.

Both of these features of the fuels described herein (low polycyclic aromatic and sulfur content) are difficult or impossible to achieve with petroleum-derived fuels, as those fuels are prepared by conventional methods, which ultimately retain various characteristic compounds, e.g., sulfur species and polycyclic aromatics, from the petroleum source which are prohibitively expensive or impossible to remove completely from the final fuel product.

Also provided herein are systems and processes for the production of SAF, which can in certain embodiments be directly substituted for Jet-A made from petroleum-derived components, from $CO_2$ and renewable power. In the system shown in FIG. 1, $CO_2$ is provided to two tubular reactor systems along with hydrogen or another reduction gas. After optional combination with recycled gases, the combined feed is separated into two streams. One stream passes through tubular Reactor 1 where a catalyst such as iron and/or cobalt oxide on a support such as $SiO_2$, alumina, zeolites, $TiO_2$; $In_2O_3$/HZSM-5; or $FeO_x$/HZSM-5 is loaded. $CO_2$ and hydrogen in Reactor 1 are converted to hydrocarbons, mainly paraffins. Additional appropriate paraffin catalysts are further described below. The other stream passes through tubular Reactor 2, where a catalyst such as $CuZnAlO_x$/HZSM-5, $ZnCr_2O_4$/ZSM-5, $ZnAlO_x$/HZSM-5, or ZnZrO/HZSM-5 is loaded to convert $CO_2$ and hydrogen into hydrocarbons, mainly aromatics. Additional appropriate aromatic catalysts are further described below. The reactor effluents from Reactor 1 and Reactor 2 are combined before they are sent to high pressure and low pressure separators. Unconverted $CO_2$ and $H_2$, plus CO generated in Reactor 1 and Reactor 2, are optionally recycled to Reactor 1 and Reactor 2.

The liquid stream from the low-pressure separator is sent to a stabilizer to remove light hydrocarbons such as LPG. The bottom liquid from the stabilizer is sent to a three-stream separator which separates the liquid into mid-range hydrocarbons ($C_{5-10}$), kerosene as the heart cut, and the diesel and heavy cut. The heart cut is sent to a fixed bed reactor where paraffin isomerization and aromatics hydrogenation occurs. Hydrogen is added to this isomerization and hydrogenation reactor. Catalysts, such as Pd or Pt on zeolite, will be loaded into the reactor. In this reactor, a portion of the n-paraffins will be converted to iso-paraffins, and a portion of the aromatics will be converted to naphthenes to meet the product ratios required by the intended use, e.g. drop-in aviation fuel. The ratio of aromatics and paraffins entering the reactor is adjusted and fixed by the sizes of Reactor 1 and Reactor 2 and their respective feed rates, which may be adjusted as needed to afford desired product characteristics. Separators are used after the Isomerization-Hydrogenation reactor to separate unconverted hydrogen and the liquid product. Finally, a product column is installed to obtain the cut for the desired product (e.g., drop-in aviation fuel). Light hydrocarbons generated will be sent back to the stabilizer, and heavy hydrocarbons will be directed to the hydrocracking unit.

Diesel and heavy hydrocarbons from the three-stream separator combining with the heavy generated from Isomerization-Hydrogenation is sent to a low-pressure hydrocracking reactor (e.g., operating at <1000 psig) to convert heavy hydrocarbons and diesel to the desired use (e.g., drop-in aviation fuel). Hydrocracking catalysts with mild operating conditions are required to operate the reactor. Hydrogen will be added to the hydrocracking reactor. Separators are required to separate un-converted hydrogen and liquid products after the reactor. A distillation column is installed after the separators where heavies hard to convert are separated from the lighter hydrocarbons, which may be recycled to the stabilizer.

The above-described process can produce aviation fuel which can be directly substituted for Jet-A derived from crude oil, since its ratio of iso- to normal paraffins, and aromatics to naphthenes can be controlled in the isomerization/hydrogenation reactor, and the ratio of paraffin to aromatics can be adjusted by controlling the relative size of Reactor 1 and Reactor 2. Those of skill in the art will appreciate that the flexibility of this system design allows these ratios to be adapted for other uses as desired. A particular advantage of the present system and method is that the aromatics and paraffins can be combined prior to purification, resulting in a significant savings in capital expenditure.

Fuel Compositions

In certain aspects, the present disclosure provides systems and methods for producing fuel compositions from a carbon source gas (e.g., $CO_2$) and a reduction gas (e.g., $H_2$). The fuel compositions produced by these systems and/or methods, e.g., the compositions described below, exhibit certain unique properties and compositional features. For example, these compositions have low total sulfur content because they (or their major components) are produced synthetically from $CO_2$. As another example, the systems and processes disclosed herein for preparing the aromatic component heavily favor the creation of monocyclic aromatics, and disfavor the creation of polycyclic aromatics. These compositional features (e.g., low sulfur content and low polycyclic aromatic content), which arise a result of the systems and processes described herein, are advantageous compared with conventional (petroleum-derived) fuels.

In some aspects, provided herein are fuel compositions comprising:
  monocyclic aromatics;
  cyclo-paraffins;
  n-paraffins; and
  iso-paraffins;
  wherein the composition comprises less than about 1 wt % polycyclic aromatics.

In certain embodiments, the composition comprises less than about 5 wt % tetralins and indanes. In further embodiments, the composition comprises less than about 1 wt % tetralins and indanes. In some embodiments, the composition comprises from 0 wt % to about 5 wt % tetralins and indanes. In further embodiments, the composition comprises from 0 wt % to about 1 wt % tetralins and indanes. In certain preferred embodiments, the composition comprises essentially no tetralins and indanes.

In some embodiments, the composition comprises less than about 0.5 wt % polycyclic aromatics. In further embodiments, the composition comprises from 0 wt % to about 0.5 wt % polycyclic aromatics. In yet further embodiments, the composition comprises from about 0.1 wt % to about 1 wt % polycyclic aromatics. In yet further embodiments, the composition comprises about 0.1 wt % or less, about 0.2 wt % or less, about 0.3 wt % or less, about 0.4 wt % or less, or about 0.5 wt % or less polycyclic aromatics. In preferred embodiments, the composition comprises essentially no polycyclic aromatics, e.g., as determined by GC-MS.

In certain preferred embodiments, essentially all of the aromatic compounds present in fuel compositions of the present disclosure are monocyclic aromatics.

In certain embodiments, the composition comprises from about 5 wt % to about 25 wt % monocyclic aromatics. In further embodiments, the composition comprises from about 8 wt % to about 15 wt % monocyclic aromatics. In yet further embodiments, the, the composition comprises about 8 wt %, about 9 wt %, about 10 wt %, about 11 wt %, about 12 wt %, about 13 wt %, or about 14 wt % monocyclic aromatics. In certain preferred embodiments, the composition comprises about 14.5 wt % monocyclic aromatics.

In certain embodiments, the composition comprises from about 15 wt % to about 65 wt % cyclo-paraffins. In further embodiments, the composition comprises from about 15 wt % to about 35 wt % cyclo-paraffins. In yet further embodiments, the composition comprises about 15 wt %, about 20 wt %, about 25 wt %, about 30 wt %, or about 35 wt % cyclo-paraffins. In certain preferred embodiments, the composition comprises about 29 wt % cyclo-paraffins.

In certain embodiments, the composition comprises from about 5 wt % to about 40 wt % iso-paraffins. In further embodiments, the composition comprises from about 5 wt % to about 15 wt % iso-paraffins. In yet further embodiments, the composition comprises about 5 wt %, about 7 wt %, about 9 wt %, about 11 wt %, about 13 wt %, or about 15 wt % iso-paraffins. In certain preferred embodiments, the composition comprises about 8.8 wt % iso-paraffins.

In certain preferred embodiments, the composition is compliant with ASTM D4054—Tier 1.

In some embodiments, the composition has a total acidity of less than about 0.10 mg KOH/g. In further embodiments, the composition has a total acidity of from about 0.05 mg KOH/g to about 0.10 mg KOH/g. In yet further embodiments, the composition has a total acidity of about 0.05 mg KOH/g, about 0.06 mg KOH/g, about 0.07 mg KOH/g, about 0.08 mg KOH/g, about 0.09 mg KOH/g, or about 0.10 mg KOH/g. In certain preferred embodiments, the composition has a total acidity of about 0.07 mg KOH/g.

In certain embodiments, the composition comprises less than about 0.3 wt % total sulfur, for example as measured by ASTM D2622. In some embodiments, the composition comprises less than about 1 ppm sulfur-containing impurities. In certain embodiments, the composition comprises essentially no sulfur-containing impurities. In certain embodiments, the composition comprises less than about 0.003 wt % sulfur mercaptan. In certain preferred embodiments, the composition comprises about 0 wt % sulfur mercaptan, for example as measured by ASTM D3227.

In some embodiments, the composition has a flash point of at least about 38° C. In further embodiments, the composition has a flash point from about 38° C. to about 370° C. In yet further embodiments, the composition has a flash point from about 38° C. to about 50° C. In still further embodiments, the composition has a flash point of about 38° C., about 39° C., about 40° C., about 41° C., about 42° C., about 43° C., about 44° C., about 45° C., about 46° C., about 47° C., about 48° C., about 49° C., or about 50° C. In certain preferred embodiments, the composition has a flash point of about 42° C.

In certain embodiments, the composition has a density from about 775 kg/m$^3$ to about 840 kg/m$^3$ at 15° C. In further embodiments, the composition has a density from about 775 kg/m$^3$ to about 785 kg/m$^3$ at 15° C. In certain embodiments, the composition has a density of about 775 kg/m$^3$, about 778 kg/m$^3$, about 780 kg/m$^3$, about 782 kg/m$^3$, or about 785 kg/m$^3$ at 15° C. In certain preferred embodiments, the composition has a density of about 780 kg/m$^3$ at 15° C.

In certain embodiments, the composition has a freezing point of less than about −40° C. In further embodiments, the composition has a freezing point of from about −70° C. to about −40° C. In yet further embodiments, the composition has a freezing point of about −70° C., about −65° C., about −60° C., about −55° C., about −50° C., about −45° C., or about −40° C. In certain preferred embodiments, the composition has a freezing point of about −51° C.

In some embodiments, the composition has a viscosity of less than about 8.0 cSt at −20° C. In certain embodiments, the composition has a viscosity of less than about 12 mm$^2$/s at −40° C. In certain preferred embodiments, the composition has a viscosity of about 3.2 mm$^2$/s at −20° C.

In certain embodiments, the composition has a net heat of combustion of at least about 42.8 MJ/kg. In further embodiments, the composition has a net heat of combustion of from about 42.8 MJ/kg to about 51 MJ/kg. In yet further embodiments, the composition has a net heat of combustion of about 42.8 MJ/kg, about 43.4 MJ/kg, about 45 MJ/kg, about 47 MJ/kg, about 49 MJ/kg, or about 51 MJ/kg. In certain preferred embodiments, the composition has a net heat of combustion of about 43.4 MJ/kg.

In certain embodiments, the composition has a smoke point of at least about 18 mm. In further embodiments, the composition has a smoke point of at least about 25 mm. In yet further embodiments, the composition has a smoke point of from about 25 mm to about 45 mm. In still further embodiments, the composition has a smoke point of about 25 mm, about 30 mm, about 35 mm, about 40 mm, or about 45 mm. In certain preferred embodiments, the composition has a smoke point of about 36 mm.

In some embodiments, the composition gives a filter pressure drop of less than about 25 mm Hg. In further embodiments, the composition gives a filter pressure drop of from 0 mm Hg to about 25 mm Hg. In certain preferred embodiments, the composition gives a filter pressure drop of about 0 mm Hg.

In certain embodiments, the composition gives a tube deposit rating of less than about 3, with essentially no peacock or abnormal color deposits. In certain preferred embodiments, the composition gives tube deposit rating of 1 VTR Color Code.

In certain embodiments, the composition has a lubricity of less than about 0.85 mm wear scar diameter (WSD). In further embodiments, the composition has a lubricity of from 0 mm WSD to about 0.85 mm WSD. In certain preferred embodiments, the composition has a lubricity of about 0.52 mm WSD.

In certain embodiments, the composition is compliant with ASTM D1655.

In certain preferred embodiments, the monocyclic aromatics are not petroleum-derived. In some preferred embodiments, the monocyclic aromatics are derived from $CO_2$. In certain preferred embodiments, the monocyclic aromatics, cyclo-paraffins, n-paraffins, and iso-paraffins are not petroleum-derived. In some preferred embodiments, the monocyclic aromatics, cyclo-paraffins, n-paraffins, and iso-paraffins are derived from $CO_2$.

In certain embodiments, the composition further comprises at least one fuel additive.

Systems for Aviation Fuel Production

In certain aspects, provided herein are systems for the conversion of carbon source gases and reduction gases to aviation fuel. In the present disclosure, certain components of these systems are described as being "coupled" to one another. As will be appreciated, the term "coupled" as used herein describes components that are operationally linked to one another, but does not preclude the presence of intervening components between those said to be coupled to one another. Additionally, as will be appreciated, various system components are described as "having" certain features. For example, in certain embodiments the paraffin reactor [25] is described as having a first reduction gas feed inlet [23], a first carbon source inlet [23], and a paraffin product outlet [27]. Such descriptions do not preclude, and specifically contemplate, the presence of additional features, such as inlets, outlets, valves, control mechanisms, measurement devices, heating and/or cooling systems, etc. Additionally, in the systems of the present disclosure, certain components are described as having one or more outlets or inlets. Such outlets and inlets may represent separate structural elements, or may be combined into a single inlet or outlet as suitable. The person of ordinary skill in the art will recognize that, once the critical features and operating conditions of systems such as those described herein are understood, the detailed design and operation of such systems involved many choices, such as specific reagent flows, separation steps, etc. While the present disclosure provides a number of specific embodiments, any suitable combination of these design choices may be made.

Further, the various systems and methods of the present disclosure sometimes reference fractions with particular carbon numbers (e.g., $C_{X-Y}$). As will be understood, these carbon numbers refer to the carbon makeup of the majority of the fraction, but said fractions may include additional components with carbon numbers that are higher or lower than indicated. Separators which are capable of creating these fractions are well known in the art, and can be adjusted as needed to afford suitable product mixtures as disclosed herein, or as otherwise desired by the operator. Certain components of said system are referred to by numbers in brackets (i.e., [10]), which correspond to components shown in FIG. 1.

In certain aspects, provided herein are systems for the production of aviation fuel comprising:
a first reduction gas feed [10];
a first carbon source feed [11];
a paraffin reactor [24] comprising a paraffin catalyst, said paraffin reactor having a first reduction gas feed inlet [23], a first carbon source inlet [23], and a paraffin product outlet [27], wherein the first reduction gas feed is coupled to the first reduction gas feed inlet, and the first carbon source feed is coupled to the first carbon source feed inlet;
a second reduction gas feed [10];
a second carbon source feed [11];
an aromatic reactor [31] comprising an aromatic catalyst, said aromatic reactor having a second reduction gas feed inlet [37], a second carbon source inlet [37], and an aromatic product outlet [33], wherein the second reduction gas feed is coupled to the second reduction gas feed inlet, and the second carbon source feed is coupled to the second carbon source feed inlet; and
a blender [20] having a paraffin product inlet [28], an aromatic product inlet [35], and a blended product outlet [39], wherein the paraffin product outlet from the paraffin reactor is coupled to the paraffin product inlet of the blender, and the aromatic product outlet from the aromatic reactor is coupled to the aromatic product inlet of the blender.

In certain embodiments, the systems further comprise a high pressure separator [40]. having a blended product inlet [39], optionally an HP recycle gas outlet [41], and an HP separated product outlet [45], wherein the blended product outlet of the blender is coupled to the blended product inlet of the high pressure separator. In further embodiments, the HP recycle gas outlet, when present, is coupled to the first reduction gas feed, the second reduction gas feed, the first carbon source feed, and/or the second carbon source feed.

In further embodiments, the systems further comprise a low pressure separator [46] having an HP separated product inlet [45], optionally an LP recycle gas outlet [47], and an LP separated product outlet [53], wherein the HP separated product outlet of the high pressure separator is coupled to the HP separated product inlet of the low pressure separator. In yet further embodiments, the LP recycle gas outlet, when present, is coupled to one or more of the first reduction gas feed, the second reduction gas feed, the first carbon source feed, and the second carbon source feed.

In still further embodiments, the systems further comprise a first separator [57] having an LP separated product inlet [56], a $C_{1-4}$ hydrocarbon outlet [58], and a $C_{5+}$ hydrocarbon outlet [59], wherein the LP separated product outlet of the low pressure separator is coupled to the LP separated product inlet of the first separator.

In certain embodiments, the systems further comprise a second separator [60] having a $C_{5+}$ hydrocarbon inlet [59], a $C_{5-8}$ hydrocarbon outlet [62], a $C_{16+}$ hydrocarbon outlet [61], and a $C_{9-15}$ hydrocarbon outlet [63], wherein the $C_{5+}$ hydrocarbon outlet of the first separator is coupled to the $C_{5+}$ hydrocarbon inlet of the second separator.

In further embodiments, the systems further comprise:
a third reduction gas feed [5]; and
an isomerization reactor [64] comprising an isomerization catalyst, said isomerization reactor having a third reduction gas feed inlet, a $C_{9-15}$ hydrocarbon inlet [63], and an isomerized product outlet [65], wherein the third reduction gas feed is coupled to the third reduction gas feed inlet, and the $C_{9-15}$ hydrocarbon outlet of the second separator is coupled to the $C_{9-15}$ hydrocarbon inlet of the isomerization reactor.

In yet further embodiments, the systems further comprise a third separator [66] having an isomerized product inlet [65], a first recycle gas outlet [75], a $C_{16+}$ hydrocarbon outlet [68], and a purified aviation fuel outlet [67], wherein the isomerized product outlet of the isomerization reactor is coupled to the isomerized product inlet of the third separator. In still further embodiments, the first recycle gas outlet [74] is coupled to the LP separated product inlet [56] of the first separator.

In certain embodiments, the systems further comprise:
a fourth reduction gas feed [6]; and
a hydrocracking reactor [69] comprising an hydrocracking catalyst, said hydrocracking reactor having a fourth reduction gas feed inlet, a first $C_{16+}$ hydrocarbon inlet [61], a second $C_{16+}$ hydrocarbon inlet [68], and a hydrocracked product outlet [70], wherein the fourth reduction gas feed is coupled to the fourth reduction gas feed inlet, the $C_{16+}$ hydrocarbon outlet of the second separator is coupled to the first $C_{16+}$ hydrocarbon inlet of the hydrocracking reactor, and the $C_{16+}$ hydrocarbon outlet of the third separator is coupled to the second $C_{16+}$ hydrocarbon inlet of the hydrocracking reactor.

In further embodiments, the systems further comprise a fourth separator [71] having a hydrocracked product inlet [70], a second recycle gas outlet [73], and a $C_{18+}$ hydrocarbon outlet [72], wherein the hydrocracked product outlet of the hydrocracking reactor is coupled to the hydrocracked product inlet of the third separator. In yet further embodiments, the second recycle gas outlet [73] is coupled to the LP separated product inlet [55/56] of the first separator.

In still further embodiments, the systems further comprise an apparatus for carbon dioxide capture coupled to the first carbon source feed and/or the second carbon source feed.

Methods for Aviation Fuel Production

As described below, the present disclosure provides various methods for conversion of carbon source gases to aviation fuel. The disclosure includes exemplary process conditions (e.g., temperature, pressure, space velocities, etc.) which provide certain advantages in context of the systems and methods disclosed herein. However, any suitable conditions may be used, and the person of ordinary skill in the art will appreciate how to vary the conditions of any particular process described herein to obtain results and tune product distribution as needed for particular applications, as contemplated.

In some aspects, provided herein are methods for the conversion of carbon source gases and reduction gases to aviation fuel, said methods comprising:
- contacting a first reduction gas and a first carbon source gas with a reduction catalyst to afford a paraffin product mixture comprising one or more paraffins;
- contacting a second reduction gas and a second carbon source gas with an aromatic catalyst to afford an aromatic product mixture comprising one or more aromatics and/or cyclic paraffins;
- blending the paraffin product mixture and the aromatic product mixture to afford a crude product mixture.

In certain aspects, provided herein are methods for the conversion of carbon source gases and reduction gases to aviation fuel, said methods comprising:
- contacting a first reduction gas and a first carbon source gas with a paraffin catalyst to afford a paraffin product mixture comprising one or more paraffins;
- contacting a second reduction gas and a second carbon source gas with an aromatic catalyst to afford an aromatic product mixture comprising one or more aromatics and/or cyclic paraffins;
- blending the paraffin product mixture and the aromatic product mixture to afford a crude product mixture.

In certain embodiments, the reduction catalyst is a paraffin catalyst or an olefin catalyst.

In certain embodiments, contacting the first reduction gas and the first carbon source gas with the reduction catalyst occurs at a paraffin temperature which may be at least 80° C., or at least 100° C., or at least 120° C. In further embodiments, the paraffin temperature may be 550° C. or less, or 600° C. or less, or 650° C. or less. In yet further embodiments, the paraffin temperature is from about 100° C. to about 600° C. In preferred embodiments, the paraffin temperature is from about 200° C. to about 500° C., and more preferably about 350° C.

In certain embodiments, contacting the first reduction gas and the first carbon source gas with the reduction catalyst occurs at a paraffin pressure from about 50 psi to about 4000 psi. In further embodiments, the paraffin pressure is from about 75 psi to about 225 psi. In yet further embodiments, the paraffin pressure is about 75 psi. In other embodiments, the paraffin pressure is about 100 psi. In some embodiments, the paraffin pressure is about 125 psi. In certain preferred embodiments, the paraffin pressure is about 150 psi. In certain embodiments, the paraffin pressure is about 175 psi. In other embodiments, the paraffin pressure is about 200 psi. In certain embodiments, the paraffin pressure is about 225 psi.

In certain embodiments, contacting a first reduction gas and a first carbon source gas with a reduction catalyst to afford a paraffin product mixture comprising one or more paraffins is carried out at a paraffin standard Gas Hourly Space Velocity (paraffin GHSV) of from about 500 mL/g*h to about 2000 mL/g*h. In further embodiments, the paraffin GHSV is from about 1250 mL/g*h to about 1750 mL/g*h. In preferred embodiments, the paraffin GHSV is about 1500 mL/g*h.

In certain embodiments, contacting the second reduction gas and the second carbon source gas with the aromatic catalyst occurs at an aromatic temperature from about 100° C. to about 500° C., preferably from about 100° C. to about 450° C. The aromatic temperature may be at least 80° C., or at least 100° C., or at least 120° C. The aromatic temperature may be 550° C. or less, or 500° C. or less, or preferably 450° C. or less. In certain embodiments, the aromatic temperature is from about 250° C. to about 350° C. In some such embodiments, the aromatic temperature is about 250° C., about 275° C., about 300° C., about 325° C., or about 350° C. In certain preferred embodiments, the aromatic temperature is about 300° C.

In some embodiments, contacting the second reduction gas and the second carbon source gas with the aromatic catalyst occurs at an aromatic pressure is from about 50 psi to about 3000 psi, preferably from about 50 psi to about 1000 psi. In certain such embodiments, the aromatic pressure is about 50 psi, about 150 psi, about 250 psi, about 350 psi, about 450 psi, about 550 psi, about 650 psi, about 750 psi, about 850 psi, about 950 psi, or about 1000 psi. In certain preferred embodiments, the aromatic pressure is about 450 psi.

In certain embodiments, contacting a second reduction gas and a second carbon source gas with an aromatic catalyst to afford an aromatic product mixture comprising one or more aromatics and/or cyclic paraffins is carried out at an aromatic standard Gas Hourly Space Velocity (aromatic GHSV) of from about 8000 mL/g*h to about 12000 mL/g*h. In further embodiments, the aromatic GHSV is from about 8750 mL/g*h to about 9250 mL/g*h. In still further embodiments, the aromatic GHSV is about 8750 mL/g*h, about 9000 mL/g*h, or about 9250 mL/g*h. In preferred embodiments, the paraffin GHSV is about 9000 mL/g*h.

In certain embodiments, the crude product mixture further comprises unreacted carbon source and/or reduction gas. In further embodiments, the method further comprises separating the unreacted $CO_2$ and/or reduction gas from the crude product mixture to afford a degassed crude product mixture. In yet further embodiments, the degassed crude product mixture comprises $C_{1-4}$ hydrocarbons, $C_{5-8}$ hydrocarbons, $C_{9-15}$ hydrocarbons, and $C_{16+}$ hydrocarbons. In still further embodiments, said separating comprises a high pressure separation, a low pressure separation, or a combination thereof. In certain embodiments, said separating comprises a high pressure separation and a low pressure separation.

In certain embodiments, the methods further comprise combining the unreacted $CO_2$ and/or reduction gas with one or more of the first reduction gas, the first carbon source gas, the second reduction gas, and the second carbon source gas. In further embodiments, the methods further comprise purifying the degassed product mixture to afford a purified product mixture comprising $C_{9-15}$ hydrocarbons. In yet further embodiments, said purifying comprises a first separation and a second separation.

In certain embodiments, the first separation comprises separating the degassed crude product mixture into:
- a first low carbon fraction comprising the $C_{1-4}$ hydrocarbons; and
- a first high carbon fraction comprising the $C_{5-8}$ hydrocarbons, the $C_{9-15}$ hydrocarbons, and the $C_{16+}$ hydrocarbons.

In further embodiments, the second separation comprises separating the first high carbon fraction into:
- a second low carbon fraction comprising the $C_{5-8}$ hydrocarbons;
- the purified product mixture comprising the $C_{9-15}$ hydrocarbons; and
- a second high carbon fraction comprising the $C_{16+}$ hydrocarbons.

In certain embodiments, the methods further comprise contacting the purified product mixture and a third reduction gas with an isomerization catalyst a to afford an isomerized product mixture comprising:

additional $C_{1-8}$ hydrocarbons;

additional $C_{9-15}$ hydrocarbons including linear paraffins, branched paraffins, cyclic paraffins, aromatics, and naphthenes; and additional $C_{16+}$ hydrocarbons.

In certain embodiments, contacting the purified product mixture and the third reduction gas with the isomerization catalyst occurs at an isomerization temperature from about 50° C. to about 450° C. In further embodiments, contacting the purified product mixture and the third reduction gas with the isomerization catalyst occurs at an isomerization pressure from about 50 psi to about 2000 psi.

In certain embodiments, the methods further comprise a third separation, wherein the third separation comprises separating the isomerized product mixture into:

a first recycle gas mixture comprising the additional $C_{1-8}$ hydrocarbons;

a third high carbon fraction comprising the additional $C_{16+}$ hydrocarbons; and purified aviation fuel comprising the additional $C_{9-15}$ hydrocarbons including linear paraffins, branched paraffins, cyclic paraffins, aromatics, and naphthenes.

In certain embodiments, the purified aviation fuel comprises from about 10% to about 20% aromatics.

In certain embodiments, the methods further comprise contacting the second high carbon fraction and/or the third high carbon fraction and a fourth reduction gas with a hydrocracking catalyst to afford a hydrocracked product mixture comprising:

$C_{1-17}$ hydrocarbons; and $C_{18+}$ hydrocarbons.

In further embodiments, the methods further comprise a fourth separation, wherein the fourth separation comprises separating the hydrocracked product mixture into:

a fourth high carbon fraction comprising the $C_{18+}$ hydrocarbons; and a second recycle gas mixture comprising the $C_{1-17}$ hydrocarbons.

In yet further embodiments, the methods further comprise combining the first recycle gas mixture and/or the second recycle gas mixture with the degassed crude product mixture. In still further embodiments, the methods further comprise capturing a carbon source gas from a gas feed stream.

In certain embodiments, provided herein are fuel compositions produced by methods of the disclosure.

Optional and preferred features of the invention relating to methods for aviation fuel production described above may also constitute optional or preferred features in relation to systems for aviation fuel production, and vice versa.

Catalysts for Conversion of Carbon Sources to Paraffins

In certain aspects, the systems and methods of the present disclosure involve the use of paraffin catalysts. In certain embodiments, the reduction catalyst is a paraffin catalyst. As used herein, the term "paraffin catalyst" refers to a catalyst used for the conversion of carbon sources and reduction gases to paraffins, but which catalyst does not necessarily itself comprise paraffins.

In certain embodiments, reduction and/or paraffin catalysts of the disclosure are described as comprising and/or being derived from a particular metal oxide, or a combination of multiple metal oxides. One of ordinary skill in the art will appreciate that during the various catalyst preparation and activation methods known in the art, and in those exemplified herein, some or all of the oxygen atoms of the metal oxide may become bonded to other atoms in the catalyst mixture, and/or may be removed from the catalyst mixture partially or entirely during an activation step (e.g., converted to $CO_2$ and removed). Additionally, one of ordinary skill in the art would appreciate that for such catalysts, e.g., the reduction and/or paraffin catalysts described below, the molar ratio of oxygen relative to the total composition may vary. Further, as will be understood, when defining catalysts made from metal oxides, the molar ratios of one metal to another are defined on a metal (rather than metal oxide) basis.

In certain aspects, the paraffin catalysts of the disclosure comprise: copper; zinc; one or more first elements selected from iron or cobalt; oxygen or carbon or nitrogen; optionally, aluminum; optionally, one or more second elements selected from a Group V, VI, VII, VIII, IX, X, and XI metal (e.g., manganese, silver, niobium, zirconium, molybdenum, ruthenium, palladium, platinum, or nickel); and optionally, one or more Group IA and IIA metals, and wherein the one or more first elements is present in an amount of about 1 to about 40 wt. % (e.g., about 1 to about 10 wt. %, about 25 to about 40 wt. %, about 30 to about 40 wt. %, or about 35 to about 40 wt. %) of the total amount of the copper, zinc, cobalt, iron, the optional second element, and the optional Group IA and IIA metal.

In some embodiments, the one or more first elements is present in an amount of about 0.5 wt. %, about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, or about 40 wt. % of the total amount of the copper, zinc, the one or more first elements, the optional second element, and the optional Group IA metal. In some embodiments, the one or more first elements is present in an amount of 1-10 wt. %, 10-20 wt. %, or 20-30 wt. %, 20-25 wt. %, 22-24 wt. %, 25-40 wt. % 30-40 wt. %, or 35-40 wt. % of the total amount of the total amount of the copper, zinc, the one or more first elements, the optional second element, and the optional Group IA metal.

In some embodiments, the paraffin catalyst comprises a cobalt-embedded interconnected matrix of reduced copper metal nanoparticles and alumina-modified zinc oxide. In some embodiments, the cobalt is present as cobalt oxide. In some embodiments, the copper is present as copper oxide. In some embodiments, the molar ratio of cobalt to copper to zinc (Co:Cu:Zn) is about 0.1-100 in cobalt, 0.05-4 in copper, and 0.05-2 in zinc. In some embodiments, the Co:Cu:Zn ratio is in the range of 1-2 in cobalt, 1-3 in copper, and 0.5-1 in zinc. In some embodiments, the Co:Cu:Zn ratio is approximately 1:2.5:1. In some embodiments, the zinc is preferably 0.3-1 the molar content of the copper. In some embodiments, the cobalt is preferably 0.1-1 the molar content of the copper.

In some embodiments, the paraffin catalyst comprises an iron-embedded interconnected matrix of reduced copper metal nanoparticles and alumina-modified zinc oxide. In some embodiments, the iron is present as iron oxide. In certain preferred embodiments, the iron oxide is magnetite ($Fe_3O_4$), hematite ($Fe_2O_3$), or a combination thereof. In further embodiments, the iron oxide is magnetite ($Fe_3O_4$). In yet further embodiments, the iron oxide is a combination of magnetite ($Fe_3O_4$) and hematite ($Fe_2O_3$).

In some embodiments, the copper is present as copper oxide. In some embodiments, the molar ratio of iron to copper to zinc (Fe:Cu:Zn) is about 0.1-100 in iron, 0.05-4 in copper, and 0.05-4 in zinc. In some embodiments, the Fe:Cu:Zn ratio is in the range of 0.4-2 in iron, 1-3 in copper, and 0.5-3 in zinc. In some embodiments, the Fe:Cu:Zn ratio is approximately 1:2.3:2.3. In some embodiments, the zinc is preferably 0.3-1 the molar content of the copper. In some embodiments, the iron is preferably 0.5-5 the molar content of the copper.

In some embodiments, the paraffin catalyst comprises one or more elements selected from a transition, or Group VI, VII, VIII, IX, X, or XI metal. In some embodiments, the paraffin catalyst comprises one or more second elements selected from a Group VI metal. In some embodiments, the paraffin catalyst comprises one or more second elements selected from a Group VII metal. In some embodiments, the paraffin catalyst comprises one or more second elements selected from a Group VIII metal. In some embodiments, the paraffin catalyst comprises one or more second elements selected from a Group IX metal. In some embodiments, the paraffin catalyst comprises one or more second elements selected from a Group X metal. In some embodiments, the paraffin catalyst comprises one or more second elements selected from a Group XI metal.

In some embodiments, the one or more second elements comprise manganese, silver, niobium, zirconium, molybdenum, ruthenium, palladium, platinum, or nickel.

In some embodiments, the one or more second elements comprise nickel. In some embodiments, the one or more second elements comprise silver. In some embodiments, the one or more second elements comprise palladium. In some embodiments, the one or more second elements comprise niobium. In some embodiments, the one or more second elements comprise manganese. In some embodiments, the one or more second elements comprise zirconium. In some embodiments, the one or more second elements comprise molybdenum.

In some embodiments, the paraffin catalyst comprises the one or more second elements at a molar ratio of about 0.05 to about 4 relative to the one or more first elements. In some embodiments, the paraffin catalyst comprises the one or more second elements at a molar ratio of about 0.05 to about 3 relative to the one or more first elements. In some embodiments, the paraffin catalyst comprises the one or more second elements at a molar ratio of about 0.05 to about 1 relative to the one or more first elements. In some embodiments, the paraffin catalyst comprises the one or more second elements at a molar ratio of about 0.05 to about 0.75 relative to the one or more first elements. In some embodiments, the paraffin catalyst comprises the one or more second elements at a molar ratio of about 0.05 to about 0.5 relative to the one or more first elements. In some embodiments, the paraffin catalyst comprises the one or more second elements at a molar ratio of about 0.05 to about 0.25 relative to the one or more first elements.

In some embodiments, the paraffin catalyst comprises copper at a molar ratio of about 0.5 to about 5 relative to the one or more first elements. In some embodiments, the paraffin catalyst comprises copper at a molar ratio of about 1 to about 10 relative to the one or more first elements. In some embodiments, the paraffin catalyst comprises copper at a molar ratio of about 2 to about 9 relative to the one or more first elements. In some embodiments, the paraffin catalyst comprises copper at a molar ratio of about 2.3 to about 8.4 relative to the one or more first elements. In some embodiments, the paraffin catalyst comprises copper at a molar ratio of about 2.3 relative to the one or more first elements. In some embodiments, the paraffin catalyst comprises copper at a molar ratio of about 8.4 relative to the one or more first elements. In some embodiments, the paraffin catalyst comprises copper at a molar ratio of about 1.5 relative to the one or more first elements. In some embodiments, the paraffin catalyst comprises copper at a molar ratio of about 1.0 relative to the one or more first elements. In some embodiments, the paraffin catalyst comprises copper at a molar ratio of about 0.75 relative to the one or more first elements. In some embodiments, the paraffin catalyst comprises copper at a molar ratio of about 0.5 relative to the one or more first elements.

In some embodiments, the paraffin catalyst comprises zinc at a molar ratio of about 0.3 to about 3 relative to copper. In some embodiments, the paraffin catalyst comprises zinc at a molar ratio of about 0.3 to about 3 relative to copper. In some embodiments, the paraffin catalyst comprises zinc at a molar ratio of about 0.4 to about 1 relative to copper. In some embodiments, the paraffin catalyst comprises zinc at a molar ratio of about 1.5 relative to copper. In some embodiments, the paraffin catalyst comprises zinc at a molar ratio of about 1.0 relative to copper. In some embodiments, the paraffin catalyst comprises zinc at a molar ratio of about 0.75 relative to copper. In some embodiments, the paraffin catalyst comprises zinc at a molar ratio of about 0.5 relative to copper. In some embodiments, the paraffin catalyst comprises zinc at a molar ratio of about 0.4 relative to copper.

In some embodiments, the one or more second elements comprise niobium. In some embodiments, the one or more second elements consist of niobium. In some embodiments, the niobium is present at a molar ratio of about 0.05 to about 1 relative to copper. In some embodiments, the niobium is present at a molar ratio of about 0.2 relative to copper. In some embodiments, the niobium is present at a molar ratio of about 0.3 relative to copper. In some embodiments, the niobium is present at a molar ratio of about 0.1 relative to copper.

In some embodiments, the paraffin catalyst comprises the one or more Group IA or IIA metals. In some embodiments, the one or more Group IA or IIA metals comprise magnesium, calcium, potassium, sodium, or cesium. In some embodiments, the one or more Group IA or IIA metals consist of magnesium, calcium, potassium, sodium, or cesium. In some embodiments, the paraffin catalyst comprises the one or more Group IA or IIA metals at a molar ratio from about 0.01 to about 1.0 relative to copper. In some embodiments, the paraffin catalyst comprises the one or more Group IA or IIA metals at a molar ratio from about 0.05 to about 0.50 relative to copper. In some embodiments, the paraffin catalyst comprises the one or more Group IA or IIA metals at a molar ratio from about 0.20 to about 0.50 relative to copper. In some embodiments, the paraffin catalyst comprises the one or more Group IA or IIA metals at a molar ratio from about 0.30 to about 0.50 relative to copper. In some embodiments, the paraffin catalyst comprises the one or more Group IA or IIA metals at a molar ratio from about 0.40 to about 0.50 relative to copper. In some embodiments, the paraffin catalyst comprises the one or more Group IA or IIA metals at a molar ratio at about 0.15 relative to copper.

In some embodiments, the paraffin catalyst comprises one or more Group IA metals. In some embodiments, the one or more Group IA or IIA metals comprise potassium, sodium or cesium. In some embodiments, the one or more Group IA or IIA metals consist of potassium, sodium or cesium. In some embodiments, the one or more Group IA or IIA metals comprise potassium. In some embodiments, the one or more Group IA or IIA metals comprise sodium. In some embodiments, the one or more Group IA or IIA metals comprise cesium. In some embodiments, the one or more Group IA or IIA metals consist of potassium. In some embodiments, the one or more Group IA or IIA metals consist of sodium. In some embodiments, the one or more Group IA or IIA metals consist of cesium.

In some embodiments, the paraffin catalyst comprises potassium at a molar ratio of about 0.05, about 0.09, about 0.1, about 0.15, about 0.2, about 0.25, about 0.3, about 0.35, about 0.4, about 0.45, or about 0.5 relative to copper. In some embodiments, the paraffin catalyst comprises potassium at a molar ratio of about 0.09 relative to copper.

In some embodiments, the paraffin catalyst comprises aluminum at a molar ratio of about 0.1 to about 10 relative to copper. In some embodiments, the paraffin catalyst comprises aluminum at a molar ratio of about 0.1 to about 1 relative to copper. In some embodiments, the paraffin catalyst comprises aluminum at a molar ratio of about 0.1 to about 0.2 relative to copper.

In some embodiments, the paraffin catalyst comprises aluminum at a molar ratio of about 0.5 to about 1 relative to copper. In some embodiments, the paraffin catalyst comprises aluminum at a molar ratio of about 0.1 relative to copper. In some embodiments, the paraffin catalyst comprises aluminum at a molar ratio of about 0.2 relative to copper.

In some embodiments, the paraffin catalyst comprises zinc oxide.

In some embodiments, the paraffin catalyst comprises copper oxide.

In some embodiments, the paraffin catalyst comprises cobalt oxide.

In some embodiments, the paraffin catalyst comprises iron oxide.

In some embodiments, the paraffin catalyst comprises nickel oxide.

In some embodiments, the paraffin catalyst comprises alumina.

In certain embodiments, the one or more Group IA or IIA metals comprise or consist of magnesium, calcium, sodium, or cesium. In certain embodiments, the one or more Group IA or IIA metals comprise or consist of sodium or cesium. In certain embodiments of the paraffin catalysts of the present disclosure, substituting magnesium, calcium, sodium or cesium for potassium does not substantially affect the catalytic activity, and magnesium, calcium, sodium and cesium have been found to provide the same stability potassium provides. This is a contrast with known syngas catalysts, where the choice of magnesium, calcium, potassium, sodium or cesium greatly affects activity.

In some embodiments, the paraffin catalyst comprises or consists of aluminum oxide ($Al_2O_3$) wherein the aluminum is present in a molar ratio of about 0.01 to about 100 relative to copper. In some embodiments, the aluminum is present in a molar ratio of about 0.1 to about 0.8 relative to copper. In some embodiments, the aluminum is present in a molar ratio of about 0.7 relative to copper. In some embodiments, the aluminum is present in a molar ratio of about 10 relative to copper. In some embodiments, the aluminum is present in a molar ratio of about 20 relative to copper. In some embodiments, the aluminum is present in a molar ratio of about 30 relative to copper. In some embodiments, the aluminum is present in a molar ratio of about 40 relative to copper. In some embodiments, the aluminum is present in a molar ratio of about 50 relative to copper. In some embodiments, the aluminum is present in a molar ratio of about 60 relative to copper. In some embodiments, the aluminum is present in a molar ratio of about 70 relative to copper. In some embodiments, the aluminum is present in a molar ratio of about 80 relative to copper. In some embodiments, the aluminum is present in a molar ratio of about 90 relative to copper. In some embodiments, the aluminum is present in a molar ratio of about 100 relative to copper. In some embodiments, the alumina can be added as a support to increase the surface area of the copper and zinc, or produced in-situ as a component of the paraffin catalyst, e.g. from aluminum nitrate co-precipitation with first element, copper, and zinc precursors.

In some embodiments, the paraffin catalyst comprises copper, zinc oxide, cobalt, and alumina. In some such embodiments, the molar ratios of the components are as described above. In some embodiments, the paraffin catalyst comprises: cobalt; copper at a molar ratio of about 8.4 relative to the cobalt; zinc at a molar ratio of about 3.3 relative to the cobalt, and alumina, with the aluminum at a molar ratio of about 1.8 relative to cobalt. In some embodiments, the paraffin catalyst comprises: copper at a molar ratio of about 8.4 relative to the cobalt; zinc oxide at a molar ratio of about 3.3 relative to the cobalt; and alumina at a molar ratio of about 0.9 relative to the cobalt.

In some embodiments, the paraffin catalyst comprises copper, zinc oxide, nickel, and alumina. In some such embodiments, the molar ratios of the components are as described above. In some embodiments, the paraffin catalyst comprises: nickel; copper at a molar ratio of about 2.5 relative to the nickel; zinc at a molar ratio of about 1 relative to the cobalt, and alumina, with the aluminum at a molar ratio of about 0.7 relative to nickel. In some embodiments, the paraffin catalyst comprises: copper at a molar ratio of about 2.5 relative to the nickel; zinc oxide at a molar ratio of about 1 relative to the nickel; and alumina at a molar ratio of about 0.35 relative to the nickel.

In some embodiments, the paraffin catalyst comprises copper, zinc oxide, iron, and alumina. In some such embodiments, the molar ratios of the components are as described above. In some embodiments, the paraffin catalyst comprises: iron; copper at a molar ratio of about 2.3 relative to the iron; zinc at a molar ratio of about 2.3 relative to the iron, and alumina, with the aluminum at a molar ratio of about 0.8 relative to iron. In some embodiments, the paraffin catalyst comprises: copper at a molar ratio of about 2.3 relative to the iron; zinc oxide at a molar ratio of about 2.3 relative to the iron; and alumina at a molar ratio of about 0.4 relative to the iron.

In some embodiments, the paraffin catalyst comprises copper, zinc oxide, cobalt, alumina, and a Group IA metal. In some embodiments, the molar ratios of the components are as described above. In some embodiments, the paraffin catalyst comprises: cobalt; copper at a molar ratio of about 8.4 relative to the cobalt; zinc at a molar ratio of about 3.3 relative to the cobalt; alumina, with the aluminum at a molar ratio of about 1.8 relative to the cobalt; and the one or more Group IA or IIA metals at a molar ratio of about 0.14 relative to the cobalt. In some embodiments, the paraffin catalyst comprises: copper at a molar ratio of about 8.4 relative to the cobalt; zinc oxide at a molar ratio of about 3.3 relative to the cobalt; alumina at a molar ratio of about 0.9 relative to the cobalt; and the one or more Group IA or IIA metals at a molar ratio of about 0.14 relative to the cobalt.

In some embodiments, the paraffin catalyst comprises copper, zinc oxide, nickel, alumina, and a Group IA metal. In some embodiments, the molar ratios of the components are as described above. In some embodiments, the paraffin catalyst comprises: nickel; copper at a molar ratio of about 2.5 relative to the nickel; zinc at a molar ratio of about 1 relative to the nickel; alumina, with the aluminum at a molar ratio of about 0.7 relative to the nickel; and the Group IA at a molar ratio of about 0.1 relative to the nickel. In some embodiments, the paraffin catalyst comprises: copper at a molar ratio of about 2.5 relative to the nickel; zinc oxide at a molar ratio of about 1 relative to the nickel; alumina at a molar ratio of about 0.35 relative to the nickel; and the one or more Group IA or IIA metals at a molar ratio of about 0.1 relative to the nickel.

In some embodiments, the paraffin catalyst comprises copper, zinc oxide, iron, alumina, and a Group IA metal. In some embodiments, the molar ratios of the components are as described above. In some embodiments, the paraffin catalyst comprises: iron; copper at a molar ratio of about 2.3 relative to the iron; zinc at a molar ratio of about 2.3 relative to the iron; alumina, with the aluminum at a molar ratio of about 0.4 relative to the iron; and the one or more Group IA or IIA metals at a molar ratio of about 0.4 relative to the iron. In some embodiments, the paraffin catalyst comprises: copper at a molar ratio of about 2.5 relative to the iron; zinc oxide at a molar ratio of about 1 relative to the iron; alumina at a molar ratio of about 0.35 relative to the iron; and the one or more Group IA or IIA metals at a molar ratio of about 0.1 relative to the iron.

In some embodiments, the paraffin catalyst comprises Cu, Zn, Al, O, and an alkali metal. In some embodiments, the paraffin catalyst comprises Cu, Zn, Ni, Al, O, and an alkali metal. In some embodiments, the paraffin catalyst comprises Cu, Zn, Fe, Al, O, and an alkali metal. In some embodiments, the paraffin catalyst comprises Cu, Zn, Co, Fe, Al, O, and an alkali metal. In some embodiments, the paraffin catalyst comprises Cu, Zn, Co, Al, O, and an alkali metal. In some embodiments, the paraffin catalyst comprises Cu, Zn, Co, Nb, Al, and O, and an alkali metal. In some embodiments, the paraffin catalyst comprises Cu, Zn, Co, Ni, Al, and O, and an alkali metal. In some embodiments, the paraffin catalyst comprises Cu, Zn, Co, Mo, Al, and O, and an alkali metal.

In some embodiments, the paraffin catalyst comprises Cu, Zn, Al, and O. In some embodiments, the paraffin catalyst comprises Cu, Zn, Fe, Al, and O. In some embodiments, the paraffin catalyst comprises Cu, Zn, Ni, Al, and O. In some embodiments, the paraffin catalyst comprises Cu, Zn, Co, Al, and O. In some embodiments, the paraffin catalyst comprises Cu, Zn, Co, Fe, Al, and O. In some embodiments, the paraffin catalyst comprises Cu, Zn, Co, Nb, Al, and O. In some embodiments, the paraffin catalyst comprises Cu, Zn, Co, Ni, Al, and O. In some embodiments, the paraffin catalyst comprises Cu, Zn, Co, Mo, Al, and 0.

In certain embodiments, the elemental composition of the paraffin catalyst material is $Cu(ZnO)CoA/Al_2O_3$, $Cu(ZnO)CoFeA/Al_2O_3$, $Cu(ZnO)CoNbA/Al_2O_3$, $Cu(ZnO)CoNiA/Al_2O_3$, $Cu(ZnO)CoMoA/Al_2O_3$ wherein A is an alkali metal and further wherein the relative amounts of the elemental components are as described above.

In certain embodiments, the elemental composition of the paraffin catalyst material is $Cu(ZnO)Co/Al_2O_3$, $Cu(ZnO)CoFe/Al_2O_3$, $Cu(ZnO)CoNb/Al_2O_3$, $Cu(ZnO)CoNi/Al_2O_3$, $Cu(ZnO)CoMo/Al_2O_3$, wherein the relative amounts of the elemental components are as described above.

In some embodiments, the paraffin catalyst is selected from one of the following exemplary catalysts: $CuO(ZnO)$, $Cu(ZnO)Co$, $Cu(ZnO)CoK$, $Cu(ZnO)CoFe$, $Cu(ZnO)CoFeK$, $Cu(ZnO)CoNi$, $Cu(ZnO)CoNiK$, $Cu(ZnO)CoNb$, $Cu(ZnO)CoNbK$, $Cu(ZnO)CoMo$, $Cu(ZnO)CoMoK$ on $Al_2O_3$, wherein the relative amounts of the elemental components are as described above. In certain such embodiments, the paraffin catalyst is approximately $CuO_{(2)}(ZnO)_{(1)}$, $Cu_{(2.5)}(ZnO)_{(1)}Co_{(1)}$, $Cu_{(2.5)}(ZnO)_{(1)}Co_{(1)}K_{(0.1)}$, $Cu_{(1)}(ZnO)_{(1)}Co_{(1)}Fe_{(1)}$, $Cu_{(1)}(ZnO)_{(1)}Co_{(1)}Fe_{(1)}K_{(0.15)}$, $Cu_{(2)}(ZnO)_{(1)}Co_{(1)}Ni_{(1)}$, $Cu_{(2)}(ZnO)_{(1)}Co_{(1)}Ni_{(1)}K_{(0.15)}$, $Cu_{(2)}(ZnO)_{(1)}Co_{(1)}Nb_{(1)}$, $Cu_{(2)}(ZnO)_{(1)}Co_{(1)}Nb_{(1)}K_{(0.15)}$, $Cu_{(2)}(ZnO)_{(1)}Co_{(1)}Mo_{(1)}$, $Cu_{(2)}(ZnO)_{(1)}Co_{(1)}Mo_{(1)}K_{(0.15)}$.

In further aspects, provided herein are catalysts for the production of paraffins comprising:
one or more metals;
optionally one or more second elements selected from copper and zinc;
optionally one or more Group VI, VII, VIII, IX, X, or XI metal additives;
optionally a Group IA or IIA metal promoter.

In certain embodiments, the one or more metals is selected from elected from cobalt, iron, nickel, indium, yttrium, a lanthanide, and combinations thereof. In further embodiments, the one or more metals is cobalt. In yet further embodiments, the one or more metals is iron. In still further embodiments, the one or more metals is a combination of iron and cobalt.

In certain embodiments, the one or more metals is present in the form of an oxide, nitride, or carbide. In further embodiments, the one or more second elements is copper. In yet further embodiments, the one or more second elements is zinc. In still further embodiments, the one or more second elements are copper and zinc. In certain embodiments, the one or more second elements is present in the form of an oxide, nitride, or carbide.

In certain embodiments, the one or more Group VI, VII, VIII, IX, X, or XI metal additives, when present, is selected from manganese, silver, niobium, zirconium, molybdenum, ruthenium, palladium, platinum, or nickel. In further embodiments, the Group IA or IIA metal promoter, when present, are Group IA elements. In yet further embodiments, the one or more Group IA or IIA metals, when present, are magnesium, calcium, lithium, sodium, potassium, or cesium. In yet further embodiments, the Group IA or IIA metal promoter, when present, is lithium, sodium, potassium, or cesium. In still further embodiments, the one or more second elements is present in an amount of about 0.5 to about 40 wt. % of the total amount of the one or more metals, the second element, the optional one or more Group VI, VII, VIII, IX, X, or XI metal additives, and the optional Group IA or IIA metal promoter.

In certain aspects, the present disclosure provides a catalyst comprising: one or more paraffin metal oxides; optionally a support, and optionally one or more metal additives.

In certain embodiments, the one or more paraffin metal oxides is selected from cobalt oxide, iron oxide, nickel oxide, indium oxide, yttrium oxide, a lanthanide oxide, and combinations thereof. In some embodiments, the support, when present, comprises carbon, silica, zeolite, alumina, zirconium oxide, titanium oxide, or silica carbide. In certain embodiments, the one or more metal additives, when present, are selected from a group IA or IIA element, palladium, platinum, ruthenium, or combinations thereof.

In certain aspects, the present disclosure provides catalytic compositions, comprising one or more of the paraffin catalysts disclosed herein and a reduction catalyst support.

The reduction catalyst support may be any suitable material that can serve as a catalyst support.

In some embodiments, the reduction catalyst support comprises one or more materials selected from an oxide, nitride, fluoride, silicate, or carbide of an element selected from aluminum, silicon, titanium, zirconium, cerium, magnesium, yttrium, lanthanum, zinc, tungsten, and tin. In some preferred embodiments, the reduction catalyst support comprises γ-alumina. In certain embodiments, the reduction catalyst support is selected from carbon, silica, zeolite, alumina, zirconium oxide, titanium oxide, and silica carbide. In some embodiments, the reduction catalyst support is selected from alumina (e.g., γ-alumina), boehmite, crystalline boehmite, pseuodboehmites, gibbsites, and thermally shocked gibbsites. In some embodiments, the reduction catalyst support is an aluminum oxide that is formed in-situ as part of the paraffin catalyst. In some embodiments, the reduction catalyst support is selected from, but not limited to, $MgO$, $Al_2O_3$, $ZrO_2$, $SnO_2$, $SiO_2$, $ZnO$, $WO_3$, and $TiO_2$. In some embodiments, the reduction catalyst support is selected from $MgO$, $Al_2O_3$, $ZrO_2$, $SnO_2$, $SiO_2$, $ZnO$, $WO_3$, silica carbide, and $TiO_2$.

In some embodiments, the reduction catalyst support comprises one or more carbon-based materials. In some embodiments, the carbon-based material is selected from activated carbon, carbon nanotubes, graphene, and graphene oxide.

In some embodiments, the reduction catalyst support is selected from $SiAlO_x$, $SO_4$—$ZrO_2$, zirconium tungstate, tungstated-titania, and anatases ($SiO_2$—$Al_2O_3$, $SiO_2$—$TiO_2$). In further embodiments, the reduction catalyst support is an aluminum-based material such as alumina (e.g., γ-alumina), boehmite, crystalline boehmite, pseuodboehmites, gibbsites, and thermally shocked gibbsites.

In some embodiments, the reduction catalyst support is a zeolite such as Y-type zeolites, beta-zeolites, ZSM-type zeolites (e.g., ZSM-5, HZSM-5, ZSM-12, ZSM-22, ZSM-57), SAPO type zeolites (e.g., SAPO11, SAPO31, SAPO41), mordenite zeolites, MCM-49, MCM-22, DA-114, microcrystalline USY zeolite, microcrystalline USY zeolite, and combinations thereof. In certain preferred embodiments, the reduction catalyst support is MCM-49. In further embodiments, the zeolites comprise additional metals such as Zn, Ga, Fe, or other transition metals. In yet further embodiments, the additional metals are present as zeolite supported metals or as isomorphous substitution in the zeolite framework.

In some embodiments, the reduction catalyst support is modified with molybdenum, chlorine, and/or sulfur.

In some embodiments, the reduction catalyst support is a mesoporous material. In such embodiments, as will be appreciated by one of ordinary skill in the art, the physical characteristics of the mesoporous material, e.g., mesopore volume and surface area may be measured using standard gas absorption measurement techniques known in the art including, for example, the Barrett-Joyner-Halenda (BJH) method for determining pore size distributions and pore volumes, and the Brunauer, Emmett and Teller (BET) method for obtaining the specific surface area (hereinafter "surface area").

In some embodiments, the reduction catalyst support has a mesopore volume from about 0.01 to about 3.0 cc/g.

In some embodiments, the reduction catalyst support has surface area from about 10 $m^2$/g to about 1000 $m^2$/g. In some preferred embodiments, the catalytic composition comprising the reduction catalyst support and a catalyst disclosed herein has a surface area from about 10 $m^2$/g to about 1000 $m^2$/g.

In some embodiments, the catalytic composition is in a form of particles having an average size from about 10 nm to about 5 μm. In some embodiments, the catalytic composition is in a form of particles having an average size from about 20 nm to about 5 μm. In some embodiments, the catalytic composition is in a form of particles having an average size from about 50 nm to about 1 μm. In some embodiments, the catalytic composition is in a form of particles having an average size from about 100 nm to about 500 nm. In some embodiments, the catalytic composition is in a form of particles having an average size from about 50 nm to about 300 nm.

In some embodiments, the catalytic composition comprises from about 5 wt. % to about 80 wt. % of the paraffin catalyst. In some embodiments, the catalytic composition comprises from about 5 wt. % to about 70 wt. % of the paraffin catalyst. In some embodiments, the catalytic composition comprises from about 20 wt. % to about 70 wt. % of the paraffin catalyst. In some embodiments, the catalytic composition comprises from about 30 wt. % to about 70 wt. % of the paraffin catalyst.

In some embodiments, the support is a high surface area scaffold. In some embodiments, the support comprises mesoporous silica. In some embodiments, the support comprises carbon allotropes.

In some embodiments, the paraffin catalyst is a nanoparticle catalyst. In some embodiments, the particle sizes of the paraffin catalyst on the surface of the scaffold are about 1 nm to 5 nm. In some embodiments, the particle sizes of the paraffin catalyst on the surface of the scaffold are about 5 nm to 100 nm. In some embodiments, the particle sizes of the paraffin catalyst on the surface of the scaffold are 100-500 nm. In some embodiments, the particles not subjected to agglomeration are 100-500 nm in particle size.

In certain embodiments, paraffin catalysts of the disclosure, such as those described above, are active in the conversion of a carbon source gas, such as $CO_2$, to paraffins.

Catalysts for Conversion of Carbon Source Gases and Reduction Gases to Linear Alpha Olefins In certain aspects, the systems and methods of the present disclosure involve the use of olefin catalysts. As used herein, the term "olefin catalyst" refers to a catalyst used for the conversion of carbon sources and reduction gases to olefins, but which catalyst does not necessarily itself comprise olefins. In certain embodiments, reduction catalysts of the disclosure are olefin catalysts of the disclosure.

In certain aspects, the present disclosure provides an olefin catalyst comprising: iron;
optionally alumina;
optionally a first element selected from copper, zinc, cobalt, or combinations thereof; and
optionally one or more second elements selected from Group IA and IIA metals.

In certain preferred embodiments, the olefin catalyst further comprises an additive mixture comprising potassium, manganese, ruthenium, and MgO. In further embodiments, the olefin catalyst comprises from about 1% to about 10% by weight of the additive mixture.

In certain embodiments, the olefin catalyst further comprises alumina.

In certain embodiments, the olefin catalyst comprises a first element selected from copper, zinc, cobalt, or combinations thereof. In further embodiments, the first element is copper. In yet further embodiments, the first element is zinc.

In still further embodiments, the first element is cobalt. In certain embodiments, the first element is a combination of copper, zinc, and/or cobalt.

In certain embodiments, the olefin catalyst comprises one or more Group IA or IIA metals. In further embodiments, the one or more Group IA or IIA metals comprise magnesium, calcium, potassium, sodium or cesium. In yet further embodiments, the one or more Group IA or IIA metals consist of magnesium, calcium, potassium, sodium or cesium. In some embodiments, the one or more Group IA or IIA metals comprise magnesium. In some embodiments, the one or more Group IA or IIA metals comprise calcium. In still further embodiments, the one or more Group IA or IIA metals comprise potassium. In certain embodiments, the one or more Group IA or IIA metals comprise sodium. In some embodiments, the one or more Group IA or IIA metals comprise cesium. In some preferred embodiments, the one or more Group IA or IIA metals consist of magnesium. In some preferred embodiments, the one or more Group IA or IIA metals consist of calcium. In some embodiments, the one or more Group IA or IIA metals consist of potassium. In some embodiments, the one or more Group IA or IIA metals consist of sodium. In some embodiments, the one or more Group IA or IIA metals consist of cesium.

In some aspects, the present disclosure provides olefin catalysts comprising:
iron;
optionally alumina;
a first element selected from K, Li, Zr, Cs, Mg, Ca, or a combination thereof; and one or more second elements selected from Au, Cu, Na, Cr, Al, Ga, Mn Co, Ru, Ni, or a combination thereof.

In certain embodiments, the olefin catalyst comprises:
iron;
K, Li, Zr, Cs, Mg, Ca, or a combination thereof, at a molar ratio of from 0 to about 0.20 relative to iron;
Au, Cu, Na, Cr, Al, Ga, Mn, or a combination thereof, at a molar ratio from 0 to about 0.60 relative to iron; Zn at a molar ratio from 0 to about 0.50 relative to iron.

In certain embodiments, the catalyst comprises K at a molar ratio of from 0 to about 0.20 relative to iron, and Na at a molar ratio from 0 to about 0.60 relative to iron. In certain preferred embodiments, the catalyst comprises K at a molar ratio of about 0.04 relative to iron, and Na at a molar ratio of about 0.006 relative to iron. In certain such embodiments, the olefin catalyst preferably does not comprise Zn.

In certain embodiments, the olefin catalyst comprises:
iron;
K, Cs, Mg, Ca, or a combination thereof, at a molar ratio of from 0 to about 0.20 relative to iron;
Na, Cu, Cr, Mn, or a combination thereof, at a molar ratio of from 0 to about 0.60 relative to iron;
Co, Ru, Ni, or a combination thereof, at a molar ratio of from 0 to about 0.50 relative to iron.

In some such embodiments, the olefin catalyst comprises K at a molar ratio of from 0 to about 0.20 relative to iron. In certain preferred embodiments, the olefin catalyst comprises K at a molar ratio of about 0.05 relative to iron.

In some preferred embodiments, the olefin catalyst comprises Co at a molar ratio of from 0 to about 0.50 relative to iron. In certain such embodiments, the olefin catalyst preferably comprises Co at a molar ratio of about 0.14 relative to iron. In certain more preferred embodiments, the olefin catalyst comprises Co at a molar ratio of about 0.14 relative to iron, and K at a molar ratio of about 0.01 relative to iron.

In certain embodiments, the olefin catalyst further comprises a reduction catalyst support.

In certain preferred embodiments, the iron is in the form of an iron oxide. In certain such embodiments, the iron oxide is magnetite ($Fe_3O_4$), hematite ($Fe_2O_3$), or a combination thereof. In further such embodiments, the iron oxide is magnetite ($Fe_3O_4$). In yet further such embodiments, the iron oxide is a combination of magnetite ($Fe_3O_4$) and hematite ($Fe_2O_3$).

In certain aspects, the olefin catalysts further comprise a reduction catalyst support. The reduction catalyst support may be any suitable material that can serve as a catalyst support.

In some embodiments, the reduction catalyst support comprises one or more materials selected from an oxide, nitride, fluoride, silicate, or carbide of an element selected from aluminum, silicon, titanium, zirconium, cerium, magnesium, yttrium, lanthanum, zinc, tungsten, and tin. In some preferred embodiments, the additional support comprises γ-alumina. In certain embodiments, the reduction catalyst support is selected from carbon, silica, zeolite, alumina, zirconium oxide, titanium oxide, and silica carbide. In some embodiments, the additional support is selected from alumina (e.g., γ-alumina), boehmite, crystalline boehmite, pseuodboehmites, gibbsites, and thermally shocked gibbsites. In some embodiments, the reduction catalyst support is an aluminum oxide that is formed in-situ as part of the paraffin catalyst. In some embodiments, the reduction catalyst support is selected from, but not limited to, MgO, $Al_2O_3$, $ZrO_2$, $SnO_2$, $SiO_2$, ZnO, $WO_3$, and $TiO_2$. In some embodiments, the reduction catalyst support is selected from MgO, $Al_2O_3$, $ZrO_2$, $SnO_2$, $SiO_2$, ZnO, $WO_3$, silica carbide, and $TiO_2$.

In some embodiments, the reduction catalyst support comprises one or more carbon-based materials. In some embodiments, the carbon-based material is selected from activated carbon, carbon nanotubes, graphene, and graphene oxide.

In some embodiments, the reduction catalyst support is selected from $SiAlO_x$, $SO_4$—$ZrO_2$, zirconium tungstate, tungstated-titania, and anatases ($SiO_2$—$Al_2O_3$, $SiO_2$—$TiO_2$). In further embodiments, the reduction catalyst support is an aluminum-based material such as alumina (e.g., γ-alumina), boehmite, crystalline boehmite, pseudoboehmites, gibbsites, and thermally shocked gibbsites.

In some embodiments, the reduction catalyst support is a zeolite such as Y-type zeolites, beta-zeolites, ZSM-type zeolites (e.g., ZSM-5, HZSM-5, ZSM-12, ZSM-22, ZSM-57), SAPO type zeolites (e.g., SAPO11, SAPO31, SAPO41), mordenite zeolites, MCM-49, MCM-22, DA-114, microcrystalline USY zeolite, microcrystalline USY zeolite, and combinations thereof. In certain preferred embodiments, the reduction catalyst support is MCM-49. In further embodiments, the zeolites comprise a modifier such as Zn, Ga, Fe, or other transition metals. In yet further embodiments, the modifier is present as zeolite supported metals or as isomorphous substitution in the zeolite framework.

In some embodiments, the reduction catalyst support is modified with molybdenum, chlorine, and/or sulfur.

In certain embodiments, the reduction catalyst support is a mesoporous material. In such embodiments, as will be appreciated by one of ordinary skill in the art, the physical characteristics of the mesoporous material, e.g., mesopore volume and surface area may be measured using standard gas absorption measurement techniques known in the art including, for example, the Barrett-Joyner-Halenda (BJH) method for determining pore size distributions and pore volumes, and the Brunauer, Emmett and Teller (BET)

method for obtaining the specific surface area (hereinafter "surface area"). In further embodiments, the reduction catalyst support has a mesopore volume from about 0.01 to about 3.0 cc/g.

In certain embodiments, the reduction catalyst support has surface area from about 10 m$^2$/g to about 1000 m$^2$/g. In certain preferred embodiments, the olefin catalyst comprising the reduction catalyst support has a surface area from about 10 m$^2$/g to about 1000 m$^2$/g.

In certain embodiments, the olefin catalyst comprising the reduction catalyst support is in a form of particles having an average size from about 10 nm to about 5 μm. In further embodiments, the olefin catalyst comprising the reduction catalyst support is in a form of particles having an average size from about 20 nm to about 5 μm. In yet further embodiments, the olefin catalyst comprising the reduction catalyst support is in a form of particles having an average size from about 50 nm to about 1 μm. In still further embodiments, the olefin catalyst comprising the reduction catalyst support is in a form of particles having an average size from about 100 nm to about 500 nm. In certain embodiments, the olefin catalyst comprising the reduction catalyst support is in a form of particles having an average size from about 50 nm to about 300 nm.

In certain embodiments, the olefin catalyst comprising the reduction catalyst support comprises from about 5 wt. % to about 80 wt. % of the olefin catalyst. In further embodiments, the olefin catalyst comprising the reduction catalyst support comprises from about 5 wt. % to about 70 wt. % of the olefin catalyst. In yet further embodiments, the olefin catalyst comprising the reduction catalyst support comprises from about 20 wt. % to about 70 wt. % of the olefin catalyst. In still further embodiments, the olefin catalyst comprising the reduction catalyst support comprises from about 30 wt. % to about 70 wt. % of the olefin catalyst.

In certain embodiments, the reduction catalyst support is a high surface area scaffold. In further embodiments, the reduction catalyst support comprises mesoporous silica. In yet further embodiments, the reduction catalyst support comprises carbon allotropes.

In certain embodiments, the olefin catalyst is a nanoparticle catalyst. In further embodiments, the particle sizes of the olefin catalyst on the surface of the scaffold are about 1 nm to 5 nm. In yet further embodiments, the particle sizes of the olefin catalyst on the surface of the scaffold are about 5 nm to 100 nm. In still further embodiments, the particle sizes of the olefin catalyst on the surface of the scaffold are 100-500 nm. In certain embodiments, the particles not subjected to agglomeration are 100-500 nm in particle size.

In certain embodiments, the olefin catalyst is pretreated with syngas. In yet further embodiments, the olefin catalyst is pretreated with hydrogen. In still further embodiments, the olefin catalyst is heated with inert gas (including but not limited to nitrogen gas, argon) before the production.

In certain embodiments, olefin catalysts of the disclosure, such as those described above, are active in the conversion of a carbon source gas, such as $CO_2$, to olefins.

Catalysts for Conversion of Carbon Sources and Reduction Gas to Aromatics

In certain aspects, the systems and methods of the present disclosure involve the use of aromatic catalysts. As used herein, the term "aromatic catalyst" refers to a catalyst used for the conversion of carbon sources and reduction gases to aromatics, but which does not necessarily itself comprise aromatics. In certain aspects, the aromatic catalysts of the disclosure comprise: one or more aromatic metal oxides; optionally an aromatic catalyst support; and optionally one or more aromatic metal additives. In certain embodiments, catalysts of the disclosure are described as comprising and/or being derived from a particular metal oxide, or a combination of multiple metal oxides. One of ordinary skill in the art will appreciate that during the various catalyst preparation and activation methods known in the art, and in those exemplified herein, some or all of the oxygen atoms of the metal oxide may become bonded to other atoms in the catalyst mixture, and/or may be removed from the catalyst mixture during an activation step (e.g., converted to $CO_2$ and removed). Additionally, one of ordinary skill in the art would appreciate that for such catalysts, e.g., the aromatic catalysts described below, the molar ratio of oxygen relative to the total composition may vary.

In certain embodiments, the one or more aromatic metal oxides is selected from zinc oxide, copper oxide, chromium oxide, and zirconium oxide. In further embodiments, the one or more aromatic metal additives, when present, are selected from a group IA or IIA element, palladium, platinum, and ruthenium. In yet further embodiments, the one or more aromatic metal oxides comprises a first aromatic metal oxide and a second aromatic metal oxide, wherein the first aromatic metal oxide is zinc or copper, and the second aromatic metal oxide is selected from chromium, aluminum, and zirconium.

In some embodiments, the first aromatic metal oxide and second metal oxide are present in a first metallic ratio of from about 1:5 to about 5:1. In certain embodiments, the first metallic ratio is about 1:5. In further embodiments, the first metallic ratio is about 1:4.5. In yet further embodiments, the first metallic ratio is about 1:4. In still further embodiments, the first metallic ratio is about 1:3.5. In certain embodiments, the first metallic ratio is about 1:3. In further embodiments, the first metallic ratio is about 1:2.5. In yet further embodiments, the first metallic ratio is about 1:2. In still further embodiments, the first metallic ratio is about 1:1.5. In certain embodiments, the first metallic ratio is about 1:1. In further embodiments, the first metallic ratio is about 1.5:1. In yet further embodiments, the first metallic ratio is about 2:1. In still further embodiments, the first metallic ratio is about 2.5:1. In certain embodiments, the first metallic ratio is about 3:1. In further embodiments, the first metallic ratio is about 3.5:1. In yet further embodiments, the first metallic ratio is about 4:1. In still further embodiments, the first metallic ratio is about 4.5:1. In certain embodiments, the first metallic ratio is about 5:1.

In certain embodiments, the aromatic catalyst comprises: one or more metals; optionally one or more Group VI, VII, VIII, IX, X, XI, or XIII metal additives; and optionally a Group IA or IIA metal promoter.

In certain embodiments, the one or more metals comprises a first metal and a second metal. In further embodiments, the first metal is zinc oxide. In yet further embodiments, the second metal is selected from zirconium, chromium, aluminum, and copper. In still further embodiments, the first metal is present in the form of an oxide, nitride, or carbide. In certain embodiments, the second metal is present in the form of an oxide, nitride, or carbide.

In certain embodiments, the ratio of the first metal to the second metal is from about 1:10 to about 10:1. In further embodiments, the ratio of the first metal to the second metal is about 1:10. In yet further embodiments, the ratio of the first metal to the second metal is about 1:9. In still further embodiments, the ratio of the first metal to the second metal is about 1:8. In certain embodiments, the ratio of the first metal to the second metal is about 1:7. In further embodiments, the ratio of the first metal to the second metal is about 1:6. In yet further embodiments, the ratio of the first metal to the second metal is about 1:5. In still further embodiments, the ratio of the first metal to the second metal is about 1:4. In certain embodiments, the ratio of the first metal to the second metal is about 1:3. In further embodiments, the ratio of the first metal to the second metal is about 1:2. In yet further embodiments, the ratio of the first metal to the second metal is about 1:1. In still further embodiments, the ratio of the first metal to the second metal is about 2:1. In certain embodiments, the ratio of the first metal to the second metal is about 3:1. In further embodiments, the ratio of the first metal to the second metal is about 4:1. In yet further embodiments, the ratio of the first metal to the second metal is about 5:1. In still further embodiments, the ratio of the first metal to the second metal is about 6:1. In certain embodiments, the ratio of the first metal to the second metal is about 7:1. In further embodiments, the ratio of the first metal to the second metal is about 8:1. In yet further embodiments, the ratio of the first metal to the second metal is about 9:1. In still further embodiments, the ratio of the first metal to the second metal is about 10:1.

In certain embodiments, the metal additive is selected from gallium, chromium, molybdenum, tungsten, manganese, rhenium, iron, ruthenium, osmium, cobalt, rhodium, iridium, nickel, palladium, platinum, copper, silver, gold, and aluminum. In certain preferred embodiments, the metal additive is gallium. In further embodiments, the metal additive is chromium. In yet further embodiments, the metal additive is molybdenum. In still further embodiments, the metal additive is tungsten. In certain embodiments, the metal additive is manganese. In further embodiments, the metal additive is rhenium. In yet further embodiments, the metal additive is iron. In still further embodiments, the metal additive is ruthenium. In certain embodiments, the metal additive is osmium. In further embodiments, the metal additive is cobalt. In yet further embodiments, the metal additive is rhodium. In still further embodiments, the metal additive is iridium. In certain embodiments, the metal additive is nickel. In further embodiments, the metal additive is palladium. In yet further embodiments, the metal additive is platinum. In still further embodiments, the metal additive is copper. In certain embodiments, the metal additive is silver. In further embodiments, the metal additive is gold. In further embodiments, the additive is aluminum.

In certain embodiments, the metal promoter is selected from lithium, sodium, potassium, rubidium, cesium, beryllium, magnesium, calcium, strontium, and barium. In further embodiments, the metal promoter is selected from lithium, sodium, potassium, rubidium, magnesium, calcium, and cesium. In yet further embodiments, the metal promoter is selected from beryllium, magnesium, calcium, strontium, and barium. In still further embodiments, the metal promoter is potassium.

In certain embodiments, the aromatic catalyst is $ZnCrO_4$.

In certain preferred embodiments, the aromatic metal is zinc; the one or more aromatic metal additives is present, and wherein the one or more aromatic metal additives is gallium; and the aromatic catalyst comprises an aromatic catalyst support, wherein the aromatic catalyst support is ZSM-5.

In certain embodiments, the aromatic catalyst comprises a mixed oxide component comprising iron and zinc; and a zeolite component comprising a zeolite. In certain embodiments, the zeolite is selected from Y-type zeolites, beta-zeolites, ZSM-type zeolites (e.g., ZSM-5, HZSM-5, ZSM-12, ZSM-22, ZSM-57), SAPO type zeolites (e.g., SAPO11, SAPO31, SAPO41), mordenite zeolites, MCM-49, MCM-22, DA-114, microcrystalline USY zeolite, microcrystalline USY zeolite, and combinations thereof. In certain preferred embodiments, the zeolite is ZSM-5.

In further embodiments, the zeolite component further comprises a modifier, preferably Ga or Zn. In yet further embodiments, the zeolite component comprises from 0 wt % to about 2 wt % of the modifier. In still further embodiments, the zeolite component comprises from 0.01 wt % to about 2 wt % of the modifier. In certain embodiments, the zeolite component comprises from 0.1 wt % to about 1.5 wt % of the modifier. In some preferred embodiments, the zeolite component comprises from 0.5 wt % to about 1 wt % of the modifier.

In certain embodiments, the aromatic catalyst comprises from about 10 wt % to about 90 wt % of the mixed oxide component and from about 90 wt % to about 10 wt % of the zeolite component. In further embodiments, the aromatic catalyst comprises from about 25 wt % to about 75 wt % of the mixed oxide component and from about 75 wt % to about 25 wt % of the zeolite component. In certain preferred embodiments, the aromatic catalyst comprises from about 40 wt % to about 60 wt % of the mixed oxide component and from about 60 wt % to about 40 wt % of the zeolite component.

In certain embodiments, the mixed oxide component comprises:
iron;
zinc in a molar ratio of from 0 to about 0.50 relative to iron;
Na, K, Cs, Mg, Ca, or a combination thereof, in a molar ratio of from 0 to about 0.10 relative to iron; Cu, Cr, Mn, or a combination thereof, in a molar ratio of from 0 to about 0.60 relative to iron.

In some embodiments, the aromatic catalyst comprises K in a molar ratio of from 0 to about 0.10 relative to iron. In certain preferred embodiments, the aromatic catalyst comprises K in a molar ratio of about 0.036 relative to iron.

In certain aspects, the aromatic catalysts further comprise an aromatic catalyst support. The aromatic catalyst support may be any suitable material that can serve as a catalyst support.

In some embodiments, the aromatic catalyst support comprises one or more materials selected from an oxide, nitride, fluoride, silicate, or carbide of an element selected from aluminum, silicon, titanium, zirconium, cerium, magnesium, yttrium, lanthanum, zinc, tungsten, and tin. In some preferred embodiments, the aromatic catalyst support comprises γ-alumina. In certain embodiments, the aromatic catalyst support is selected from carbon, silica, zeolite, alumina, zirconium oxide, titanium oxide, and silica carbide. In some embodiments, the aromatic catalyst support is selected from alumina (e.g., γ-alumina), boehmite, crystalline boehmite, pseuodboehmites, gibbsites, and thermally shocked gibbsites. In some embodiments, the aromatic catalyst support is an aluminum oxide that is formed in-situ as part of the paraffin catalyst. In some embodiments, the aromatic catalyst support is selected from, but not limited to, MgO, $Al_2O_3$, $ZrO_2$, $SnO_2$, $SiO_2$, ZnO, $WO_3$, and $TiO_2$. In some embodiments, the aromatic catalyst support is selected from MgO, $Al_2O_3$, $ZrO_2$, $SnO_2$, $SiO_2$, ZnO, $WO_3$, silica carbide, and $TiO_2$.

In some embodiments, the aromatic catalyst support comprises one or more carbon-based materials. In some embodiments, the carbon-based material is selected from activated carbon, carbon nanotubes, graphene, and graphene oxide.

In some embodiments, the aromatic catalyst support is selected from $SiAlO_x$, $SO_4$—$ZrO_2$, zirconium tungstate, tungstated-titania, and anatases ($SiO_2$—$Al_2O_3$, $SiO_2$—$TiO_2$). In further embodiments, the aromatic catalyst support is an aluminum-based material such as alumina (e.g., γ-alumina), boehmite, crystalline boehmite, pseuodboehmites, gibbsites, and thermally shocked gibbsites.

In some embodiments, the aromatic catalyst support is a zeolite such as Y-type zeolites, beta-zeolites, ZSM-type zeolites (e.g., ZSM-5, HZSM-5, ZSM-12, ZSM-22, ZSM-57), SAPO type zeolites (e.g., SAPO11, SAPO31, SAPO41), mordenite zeolites, MCM-49, MCM-22, DA-114, microcrystalline USY zeolite, microcrystalline USY zeolite, and combinations thereof. In certain preferred embodiments, the aromatic catalyst support is ZSM-5. In further embodiments, the zeolites comprise a modifier such as Zn, Ga, Fe, or other transition metals. In yet further embodiments, the modifier is present as a zeolite supported metal or as isomorphous substitution in the zeolite framework.

In some embodiments, the aromatic catalyst support is modified with molybdenum, chlorine, and/or sulfur.

In some embodiments, the aromatic catalyst support is a mesoporous material. In some embodiments, the aromatic catalyst support has a mesopore volume from about 0.01 to about 3.0 cc/g.

In some embodiments, the aromatic catalyst support has surface area from about 10 $m^2$/g to about 1000 $m^2$/g. In some preferred embodiments, the catalytic composition comprising the aromatic catalyst support and a catalyst disclosed herein has a surface area from about 10 $m^2$/g to about 1000 $m^2$/g.

In some embodiments, the catalytic composition is in a form of particles having an average size from about 10 nm to about 5 μm. In some embodiments, the catalytic composition is in a form of particles having an average size from about 20 nm to about 5 μm. In some embodiments, the catalytic composition is in a form of particles having an average size from about 50 nm to about 1 μm. In some embodiments, the catalytic composition is in a form of particles having an average size from about 100 nm to about 500 nm. In some embodiments, the catalytic composition is in a form of particles having an average size from about 50 nm to about 300 nm.

In some embodiments, the catalytic composition comprises from about 5 wt. % to about 80 wt. % of the aromatic catalyst. In some embodiments, the catalytic composition comprises from about 5 wt. % to about 70 wt. % of the aromatic catalyst. In some embodiments, the catalytic composition comprises from about 20 wt. % to about 70 wt. % of the aromatic catalyst. In some embodiments, the catalytic composition comprises from about 30 wt. % to about 70 wt. % of the aromatic catalyst.

In some embodiments, the support is a high surface area scaffold. In some embodiments, the support comprises mesoporous silica. In some embodiments, the support comprises carbon allotropes.

In some embodiments, the aromatic catalyst is a nanoparticle catalyst. In some embodiments, the particle sizes of the aromatic catalyst on the surface of the scaffold are about 1 nm to 5 nm. In some embodiments, the particle sizes of the aromatic catalyst on the surface of the scaffold are about 5 nm to 100 nm. In some embodiments, the particle sizes of the aromatic catalyst on the surface of the scaffold are 100-500 nm. In some embodiments, the particles not subjected to agglomeration are 100-500 nm in particle size.

Optional and preferred features of the invention relating to catalysts for conversion of carbon sources and reduction gas to aromatics described above may also constitute optional or preferred features in relation to catalysts for conversion of carbon sources to paraffins or catalysts for conversion of carbon source gases and reduction gases to linear alpha olefins, and vice versa.

In certain embodiments, aromatic catalysts of the disclosure, such as those described above, are active in the conversion of a carbon source gas, such as $CO_2$, to aromatics.

Catalysts for Hydrogenation and Isomerization

In certain aspects, the systems and methods of the present disclosure involve the use of hydrogenation and isomerization catalyst (referred to herein as "isomerization catalysts") for isomerizing and/or hydrogenating percentages of the hydrocarbons produced. Any suitable hydrogenation and/or isomerization catalysts known in the art may be used in these processes. However, the particular embodiments set forth below are provided both to exemplify the use of such catalysts and to identify catalysts particularly well-suited for use in conjunction with the other features of the systems and methods disclosed herein.

In certain embodiments, the isomerization catalysts of the present disclosure are aluminosilicate catalysts, such as zeolites. In further embodiments, the isomerization catalyst is $AlCl_3$. In yet further embodiments, the isomerization catalyst is doped with a transition metal, such as Pt, Pd, etc. In still further embodiments, the isomerization catalyst is Pt on beta-zeolite. In certain embodiments, isomerization catalysts of the disclosure comprise an isomerization metal, and an isomerization support. The isomerization support may be any suitable material that can serve as a catalyst support.

In some embodiments, the isomerization support comprises one or more materials selected from an oxide, nitride, fluoride, silicate, or carbide of an element selected from aluminum, silicon, titanium, zirconium, cerium, magnesium, yttrium, lanthanum, zinc, tungsten, and tin. In some preferred embodiments, the isomerization support comprises γ-alumina. In certain embodiments, the isomerization support is selected from carbon, silica, zeolite, alumina, zirconium oxide, titanium oxide, and silica carbide. In some embodiments, the isomerization support is selected from alumina (e.g., γ-alumina), boehmite, crystalline boehmite, pseuodboehmites, gibbsites, and thermally shocked gibbsites. In some embodiments, the isomerization support is an aluminum oxide that is formed in-situ as part of the paraffin catalyst. In some embodiments, the isomerization support is selected from, but not limited to, MgO, $Al_2O_3$, $ZrO_2$, $SnO_2$, $SiO_2$, ZnO, $WO_3$, and $TiO_2$. In some embodiments, the isomerization support is selected from MgO, $Al_2O_3$, $ZrO_2$, $SnO_2$, $SiO_2$, ZnO, $WO_3$, silica carbide, and $TiO_2$.

In some embodiments, the isomerization support comprises one or more carbon-based materials. In some embodiments, the carbon-based material is selected from activated carbon, carbon nanotubes, graphene, and graphene oxide.

In some embodiments, the isomerization support is selected from $SiAlO_x$, $SO_4$—$ZrO_2$, zirconium tungstate, tungstated-titania, and anatases ($SiO_2$—$Al_2O_3$, $SiO_2$—$TiO_2$). In further embodiments, the isomerization support is an aluminum-based material such as alumina (e.g., γ-alumina), boehmite, crystalline boehmite, pseuodboehmites, gibbsites, and thermally shocked gibbsites.

In some embodiments, the isomerization support is a zeolite such as Y-type zeolites, beta-zeolites, ZSM-type zeolites (e.g., ZSM-5, HZSM-5, ZSM-12, ZSM-22, ZSM-57), SAPO type zeolites (e.g., SAPO11, SAPO31, SAPO41), mordenite zeolites, MCM-49, MCM-22, DA-114, microcrystalline USY zeolite, microcrystalline USY zeolite, and combinations thereof. In further embodiments, the zeolites comprise a modifier such as Zn, Ga, Fe, or other transition metals. In yet further embodiments, the modifier is present as a zeolite supported metal or as isomorphous substitution in the zeolite framework.

In some embodiments, the isomerization support is modified with molybdenum, chlorine, and/or sulfur.

In further embodiments, the isomerization metal is selected from Pd, Pt, Ni—Co, Ni—W, and Ni—Mo. In yet further embodiments, the zeolite support is selected from $SiAlO_x$, $SO_4$—$ZrO_2$, Y-type zeolites, beta-zeolite, ZSM5, ZSM22, SAPO11, SAPO31, SAPO41, MCM-49, MCM-22, $TiO_2$, $WO_3$, zirconium tungstate, tungstated-titania, and anatases ($SiO_2$—$Al_2O_3$, $SiO_2$—$TiO_2$). In some embodiments, the zeolite support is selected from $TiO_2$, $WO_3$, zirconium tungstate, tungstated-titania, and anatases ($SiO_2$—$Al_2O_3$, $SiO_2$—$TiO_2$). In still further embodiments, the isomerization catalyst is selected from $Pt/ZrO_2/WO_3$, $Pt/ZrWO_4$, $Pt/SiAlO_x$, $Pt/SO_4$—$ZrO_2$, $Pt/ZSM5$, $Pt/ZSM22$, Pt/SAPO, Ni—$W/SiAlO_x$, Ni—$W/SO_4$—$ZrO_2$, Ni—W/ZSM5, Ni—W/ZSM22, and Ni—W/SAPO. In certain preferred embodiments, the isomerization catalyst is $Pt/ZrO_2/WO_3$. In other preferred embodiments, the isomerization catalyst is Pt/SAPO comprising 0.2 wt % Pt.

In certain embodiments, the isomerization metal comprises from about 0.5 wt % to about 40 wt % of the isomerization catalyst. In further embodiments, the isomerization metal comprises about 0.5 wt % of the isomerization catalyst. In yet further embodiments, the isomerization metal comprises about 1 wt % of the isomerization catalyst. In still further embodiments, the isomerization metal comprises about 10 wt % of the isomerization catalyst. In certain embodiments, the isomerization metal comprises about 20 wt % of the isomerization catalyst. In further embodiments, the isomerization metal comprises about 30 wt % of the isomerization catalyst. In yet further embodiments, the isomerization metal comprises about 40 wt % of the isomerization catalyst.

Optional and preferred features of the invention relating to catalysts for hydrogenation and isomerization described above may also constitute optional or preferred features in relation to catalysts for conversion of carbon sources to paraffins, catalysts for conversion of carbon source gases and reduction gases to linear alpha olefins or catalysts for conversion of carbon sources and reduction gas to aromatics, and vice versa.

Catalysts for Hydrocracking

The systems and methods of the present disclosure can use any suitable hydrocracking catalyst, including those known in the art. In some embodiments, similar catalysts to those described for the hydrogenation and isomerization step (above) are also used for hydrocracking.

Any suitable hydrocracking catalysts known in the art may be used in these processes. However, the particular embodiments set forth below are provided both to exemplify the use of such catalysts and to identify catalysts particularly well-suited for use in conjunction with the other features of the systems and methods disclosed herein.

In further embodiments, the hydrocracking catalyst comprises a hydrocracking metal, such as Pd, Pt, Ni, Co, Co—W, Ni—W, and Ni—Mo, and a hydrocracking support. The hydrocracking support may be any suitable material that can serve as a catalyst support.

In some embodiments, the hydrocracking support comprises one or more materials selected from an oxide, nitride, fluoride, silicate, or carbide of an element selected from aluminum, silicon, titanium, zirconium, cerium, magnesium, yttrium, lanthanum, zinc, tungsten, and tin. In some preferred embodiments, the hydrocracking support comprises γ-alumina. In certain embodiments, the hydrocracking support is selected from carbon, silica, zeolite, alumina, zirconium oxide, titanium oxide, and silica carbide. In some embodiments, the hydrocracking support is selected from alumina (e.g., γ-alumina), boehmite, crystalline boehmite, pseuodboehmites, gibbsites, and thermally shocked gibbsites. In some embodiments, the hydrocracking support is an aluminum oxide that is formed in-situ as part of the paraffin catalyst. In some embodiments, the hydrocracking support is selected from, but not limited to, MgO, $Al_2O_3$, $ZrO_2$, $SnO_2$, $SiO_2$, ZnO, $WO_3$, and $TiO_2$. In some embodiments, the hydrocracking support is selected from MgO, $Al_2O_3$, $ZrO_2$, $SnO_2$, $SiO_2$, ZnO, $WO_3$, silica carbide, and $TiO_2$.

In some embodiments, the hydrocracking support comprises one or more carbon-based materials. In some embodiments, the carbon-based material is selected from activated carbon, carbon nanotubes, graphene, and graphene oxide.

In some embodiments, the hydrocracking support is selected from $SiAlO_x$, $SO_4$—$ZrO_2$, zirconium tungstate, tungstated-titania, and anatases ($SiO_2$—$Al_2O_3$, $SiO_2$—$TiO_2$). In further embodiments, the hydrocracking support is an aluminum-based material such as alumina (e.g., γ-alumina), boehmite, crystalline boehmite, pseuodboehmites, gibbsites, and thermally shocked gibbsites.

In some embodiments, the hydrocracking support is a zeolite such as Y-type zeolites, beta-zeolites, ZSM-type zeolites (e.g., ZSM-5, HZSM-5, ZSM-12, ZSM-22, ZSM-57), SAPO type zeolites (e.g., SAPO11, SAPO31, SAPO41), mordenite zeolites, MCM-49, MCM-22, DA-114, microcrystalline USY zeolite, microcrystalline USY zeolite, and combinations thereof. In further embodiments, the zeolites comprise a modifier such as Zn, Ga, Fe, or other transition metals. In yet further embodiments, the modifier is present as a zeolite supported metal or as isomorphous substitution in the zeolite framework.

In some embodiments, the hydrocracking support is modified with molybdenum, chlorine, and/or sulfur.

In certain embodiments, the hydrocracking metal comprises from about 0.5 wt % to about 40 wt % of the hydrocracking catalyst. In further embodiments, the hydrocracking metal comprises about 0.5 wt % of the hydrocracking catalyst. In yet further embodiments, the hydrocracking metal comprises about 1 wt % of the hydrocracking catalyst. In still further embodiments, the hydrocracking metal comprises about 10 wt % of the hydrocracking catalyst. In certain embodiments, the hydrocracking metal comprises about 20 wt % of the hydrocracking catalyst. In further embodiments, the hydrocracking metal comprises about 30 wt % of the hydrocracking catalyst. In yet further embodiments, the hydrocracking metal comprises about 40 wt % of the hydrocracking catalyst.

Optional and preferred features of the invention relating to catalysts for hydrocracking described above may also constitute optional or preferred features in relation to catalysts for conversion of carbon sources to paraffins, catalysts for conversion of carbon source gases and reduction gases to linear alpha olefins, catalysts for conversion of carbon sources and reduction gas to aromatics or catalysts for hydrogenation and isomerization, and vice versa.

Reduction Gases, Carbon Source Gases, and Ratios Thereof

The systems and methods of the present disclosure can be designed to utilize any combination of suitable reduction gases and suitable carbon source gases. Said carbon source and reduction gases may in certain embodiments be provided into the requisite reaction vessels separately, or they may in certain embodiments be pre-mixed (e.g., the first reduction gas feed and the first carbon source gas feed can, in some embodiments refer to the same physical feature, as can the second reduction as feed and the second carbon source gas feed) to provide a single feed stream comprising both a carbon source gas and a reduction gas, which is coupled to the appropriate reactor.

Additionally, a single gas feed comprising the first reduction gas feed, the first carbon source gas feed, the second reduction gas feed, and the second carbon source gas feed can be pre-mixed to provide a single feed stream comprising both a carbon source gas and a reduction gas, coupled to both the aromatic reactor and the paraffin reactor.

In certain embodiments, the first reduction gas, the second reduction gas, the third reduction gas, and the fourth reduction gas are independently selected from $H_2$, a hydrocarbon, synthesis gas ($CO/H_2$), or from a gas that is, or is derived from, flare gas, waste gas, or natural gas.

In certain embodiments, the first reduction gas, the second reduction gas, the third reduction gas, and/or the fourth reduction gas is $H_2$. In further embodiments, the first reduction gas, the second reduction gas, the third reduction gas, and/or the fourth reduction gas is synthesis gas. In yet further embodiments, the first reduction gas, the second reduction gas, the third reduction gas, and/or the fourth reduction gas is a hydrocarbon, such as $CH_4$, ethane, propane, or butane. In still further embodiments, the first reduction gas, the second reduction gas, the third reduction gas, and/or the fourth reduction gas is, or is derived from, flare gas, waste gas, or natural gas. In certain embodiments, the first reduction gas, the second reduction gas, the third reduction gas, and/or the fourth reduction gas is $CH_4$.

In certain preferred embodiments, the first carbon source gas and/or the second carbon source gas is $CO_2$. In further embodiments, the first carbon source gas and/or the second carbon source gas comprises $CO_2$. In yet further embodiments, the first carbon source gas and/or the second carbon source gas is CO. In still further embodiments, the first carbon source gas and/or the second carbon source gas comprises CO.

As will be understood by those of skill in the art, the flow rate of carbon source gas and/or reduction gas, or various product mixtures through the paraffin and/or aromatic reactors (or elsewhere in the disclosed systems and methods) can be adjusted as needed to afford the desired product output characteristics.

Additionally, as will be understood by those of skill in the art, the carbon source gases and the reduction gases may be provided in any suitable ratio that affords the desired product output characteristics. In certain embodiments, the molar ratio of the first reduction gas to the first carbon source gas is from about 10:1 to about 1:10. In further embodiments, the molar ratio of the first reduction gas to the first carbon source gas is from about 5:1 to about 0.5:1. In yet further embodiments, the molar ratio of the second reduction gas to the second carbon source gas is from about 10:1 to about 1:10. In still further embodiments, the molar ratio of the second reduction gas to the second carbon source gas is from about 5:1 to about 0.5:1.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, MA (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, C.A. (1985).

All of the above, and any other publications, patents and published patent applications referred to in this application are specifically incorporated by reference herein. In case of conflict, the present specification, including its specific definitions, will control.

The term "Log of solubility", "Log S" or "log S" as used herein is used in the art to quantify the aqueous solubility of a compound. The aqueous solubility of a compound significantly affects its absorption and distribution characteristics. A low solubility often goes along with a poor absorption. Log S value is a unit stripped logarithm (base 10) of the solubility measured in mol/liter.

The term "monocyclic aromatic(s)" as used herein refer to compounds comprising only one single aromatic ring, which may be substituted or unsubstituted (e.g., alkylbenzenes), and which may optionally be fused with non-aromatic rings (e.g., tetralins and indanes).

The term "polycyclic aromatic(s)" as used herein refers to compounds comprising at least two aromatic rings, which may be fused (e.g., two distinct rings sharing two adjacent ring atoms). As a non-limiting example, the term "polycyclic aromatics" may be used to refer to a group of compounds comprising naphthalene and/or naphthalene derivatives.

The term "petroleum-derived" as used herein refers to compounds and compositions that are derived by physical and chemical processes from petroleum feedstocks, but does not include compounds and compositions whose carbon is derived from carbon dioxide or carbon monoxide, even if that carbon dioxide or carbon monoxide was produced from petroleum feedstocks (e.g., by combusting petroleum).

When the amount of an impurity is specified at a level of "about 0", it is understood by those of skill in the art that such a measurement is accurate to a certain number of significant figures based on the relevant detection method used.

EXAMPLES

The invention now being generally described, it will be more readily understood by reference to the following examples which are included merely for purposes of illustration of certain aspects and embodiments of the present invention, and are not intended to limit the invention.

Example 1: Exemplary $CO_2$-to-Aromatic Catalyst Compositions

Exemplary aromatic catalysts of the disclosure comprise a mixed metal oxide and a zeolite support. The ratio of the mixed metal oxide and zeolite may be:

a. Mixed oxide: 10% to 90%, zeolite: 90% to 10%
b. Mixed oxide: 25% to 75%, zeolite: 75% to 25%
c. Mixed oxide: 40% to 60%, zeolite: 60% to 40%

The mixed oxide component of the exemplary catalysts comprises iron and zinc oxide modified with additional metals which is donated as $A_aB_bFe_{100}Zn_xO_y$ where a, b, and x represent the atomic composition of each metal and y is the number of oxygen atoms to complement the metal. A consists of at least one of Na, K, Cs, Mg, or Ca, and B consists of at least one of Cu, Cr, or Mn. The range of a, b, and x are shown below:
 a. 0<a<10
 b. 0<=b<60
 c. 0<=x<50

The zeolite component of the exemplary catalyst is ZSM5 or metal- or metalloid-modified ZSM5 having the formula $M_xZSM5_y$, where x and y are the weight percentage of metal and ZSM5. M consists of Ga or Zn and the range of x and y are shown below:
 a. $ZSM5_{100}$
 b. $Ga_{0.01}ZSM5_{99.99}$ to $Ga_2ZSM5_{98}$
 c. $Ga_{0.1}ZSM5_{99.9}$ to $Ga_{1.5}ZSM5_{98.5}$
 d. $Ga_{0.5}ZSM5_{99.5}$ to $Ga_1ZSM5_{99}$
 e. $Zn_{0.01}ZSM5_{99.99}$ to $Zn_2ZSM5_{98}$
 f. $Zn_{0.1}ZSM5_{99.9}$ to $Zn_{1.5}ZSM5_{98.5}$
 g. $Zn_{0.5}ZSM5_{99.5}$ to $Zn_1ZSM5_{99}$

Example 2: General Procedure for CO$_2$-to-Aromatic Catalyst Synthesis

An aromatic catalyst of the disclosure is synthesized via incipient wetness impregnation of zinc nitrate and chromium nitrate (Zn/Cr=0.5) onto the H-ZSM-5 support. The metal content of zinc and chromium is 38 wt %. The HZSM-5 support is made through hydrothermal reformation of tetraethyl orthosilicate and aluminum nitrate (Si/Al=70) at 180° C. for 48 hours. The resulting product was dried overnight at 110° C. Calcination was performed at 450° C. for 2 hours.

Example 3: Synthesis of Exemplary CO$_2$-to-Aromatic Catalysts

Mixed Metal Oxide preparation: 109.1 g of ferric nitrate nonahydrate and 20.1 g zinc nitrate hexahydrate were dissolved in 675 mL water to obtain solution I. 47.2 g of sodium carbonate was dissolved in 891 mL water to obtain solution II. Solution I and solution II were added to a flask containing 100 mL water heated to 338 K under stirring. The feed rate of solution II is 1.3 times of the feed rate of solution I so that the addition of both solutions completed at the same time. After the addition, the temperature of the solution was increased to 353 K and the precipitated solid was aged in the solution for 1 hour. After the aging, the solid was separated from the solution by filtration. The resulting solid was then washed by water until the sodium level in the solid was below 0.1 wt %. The washed solid was then dried at 395 K for 6 hours to obtain solid I. 1.34 g potassium carbonate was dissolved in 1.5 mL of water to obtain solution III. Solution III was combined with solid I to obtain mixture I which was dried at 395 K for 6 hours to obtain solid II. Solid II was then calcined at 623 K for 12 hours. The obtained mixed oxide was $K_{3.6}Fe_{100}Zn_{16}O_y$.

Ga-ZSM5 support preparation: 3.7 g of gallium nitrate was dissolved in 3 mL water to obtain solution I. Solution I was then mixed with 99 g of ZSM5 to obtain mixture I. Mixture I was dried at 395 K for 6 hours to obtain solid I. Solid I was calcined at 773 K for 12 hours. The obtained solid was $Ga_1ZSM5_{99}$.

Zn-ZSM5 support preparation: 2.9 g of zinc nitrate hexahydrate was dissolved in 3 mL water to obtain solution I. Solution I was then mixed with 99 g of ZSM5 to obtain mixture I. Mixture I was dried at 395 K for 6 hours to obtain solid I. Solid I was calcined at 773 K for 12 hours. The obtained solid was $Zn_1ZSM5_{99}$.

Example 4: General Procedure for Conversion of CO$_2$ to Aromatics

Aromatic formation from CO$_2$ and hydrogen is carried out in a fixed bed flow reactor. The flow reactor is loaded with 1 kg of $ZnCr_2O_4$ on HZSM-5 catalyst. The catalyst is reduced in situ in a hydrogen environment at 350° C. for 2 hours. The reactor is heated to 300° C. after pretreatment. A feed mixture of 75% hydrogen and 25% CO$_2$ is introduced to the reactor at 300 psi and a gas hourly space velocity of 5,000 h$^{-1}$. The CO$_2$ is converted into a mixture of alkylated aromatics with a selective range of carbon chain numbers ($C_8$-$C_{12}$).

Example 5: Exemplary Procedure I for CO$_2$ Hydrogenation to SAF-Range Aromatics (Commercial ZSM5)

Catalyst made by the method from Example 1, $K_{3.6}Fe_{100}Zn_{16}O_y$ was granulated to 40 to 60 mesh size. Commercial ZSM5 was granulated to the same 40 to 60 mesh size. Equal weight of granulated $K_{3.6}Fe_{100}Zn_{16}O_y$ and ZSM5 was mixed by a rotating mixer at 60 rpm for 1 minute to obtain the final catalyst I. 2 grams of catalyst I was loaded into a ½" tubing fixed-bed reactor.

Catalyst I was activated by a gas stream of 5% H2 diluted with nitrogen. The activation was operated at 200 PSIG and 623 K. The activation duration was 5 hours. After activation, a mix gas of CO2 and H2 was introduced into the reactor. The H2/CO$_2$ molar ratio was 3:1. The reactor was operated at pressure of 450 PSIG and temperature of 573 K with a standard gas hourly space velocity of 9000 mL/g*h. The reactor effluent of liquid and gas was measured and the per-pass CO$_2$ conversion and the major component carbon selectivity was reported in Table 5.1:

TABLE 5.1

Product distribution of Example 4

| Catalyst Sample | Per-pass CO2 Conversion, % | Carbon Selectivity, % | | |
|---|---|---|---|---|
| | | CO | Total Aromatics | SAF Range Aromatics |
| Catalyst I | 26.9 | 16.3 | 28.8 | 15.1 |

Polycyclic aromatics in aromatics was between 1 and 2 wt %

Example 6: Exemplary Procedure II for CO$_2$ Hydrogenation to SAF-Range Aromatics (Modified ZSM-5)

A mixed-metal oxide made by the method from Example 3, e.g., $K_{3.6}Fe_{100}Zn_{16}O_y$ was granulated to 40 to 60 mesh size. A catalyst support, e.g., $Ga_1ZSM5_{99}$ made by the method from Example 3 was granulated to the same 40 to 60 mesh size. Equal weight of granulated $K_{3.6}Fe_{100}Zn_{16}O_y$ and $Ga_1ZSM5_{99}$ was mixed by a rotating mixer at 60 rpm for 1 minute to obtain catalyst II. 2 grams of catalyst II was loaded into a ½" tubing fixed-bed reactor.

Catalyst II was activated by a gas stream of 5% $H_2$ diluted with nitrogen. The activation was operated at 200 PSIG and 623 K. The activation duration was 5 hours. After activation, a mix gas of $CO_2$ and $H_2$ was introduced into the reactor. The $H_2/CO_2$ molar ratio was 3:1. The reactor was operated at pressure of 450 PSIG and temperature of 573 K with a standard gas hourly space velocity of 9000 mL/g*h. The reactor effluent of liquid and gas was measured and the per-pass $CO_2$ conversion and the major component carbon selectivity was reported in Table 6.2:

TABLE 6.2

Product distribution obtained by exemplary procedure II for hydrogenation to aromatics

| | | Carbon Selectivity, % | |
|---|---|---|---|
| Catalyst Sample | Per-pass CO2 Conversion, % | CO | Total Aromatics | SAF Range Aromatics |
| Catalyst II | 39.3 | 12.0 | 35.4 | 19.5 |

Polycyclic aromatics in aromatics was between 1 and 2 wt %

Example 7: Exemplary $CO_2$-to-Paraffin Catalyst Compositions

Exemplary paraffin catalysts of the disclosure comprise a mixed metal oxide. Exemplary mixed oxide compositions are given below:

Mixed oxide composition denoted $A_aB_bFe_{100}Zn_xO_y$: The catalyst is a mixed oxide consisting of iron, zinc oxide with additional promoter metals. The catalyst is donated as $A_aB_bFe_{100}Zn_xO_y$, where a, b, and x represent the atomic composition of each metal and y is the number of oxygen atoms to complement the metal. A is at least one of K, Li, Zr, Cs, Mg, and Ca, and B is at least one of Au, Cu, Na, Cr, Al, Ga and Mn. The range of a, b, and x are shown below:
  a. 0≤a<20
  b. 0≤b<60
  c. 0≤x<50

Mixed oxide composition denoted $A_aB_bFe_{100}X_c$: The mixed oxide component of the catalyst consists of iron and zinc oxide modified with additional metals which is donated as $A_aB_bFe_{100}X_c$: where a, b, and c represent the atomic composition of each metal. A is at least one of K, Cs, Mg, and Ca; and B is at least one of Na, Cu, Cr, and Mn, and X is at least one of Co, Ru and Ni. The range of a, b, and c are shown below:
  a. 0≤a<20
  b. 0≤b<60
  c. 0≤c<50

Example 8: Synthesis of Exemplary $CO_2$-to-Paraffin Catalyst Compositions

I. Mixed oxide catalyst preparation: An iron oxide and zinc oxide complex was first prepared by co-precipitation using a metal nitrate precursor solution with a 0.5 M concentration. This was then reacted with a 1.2 molar equivalents of sodium carbonate, mixed using parallel addition at 338 K over 1 hour.

This formed slurry was then aged while continuously stirring at 353K for 1 hour. The precipitate was then obtained by using vacuum filtration and a 0.25 micro filter. Excess Sodium was removed by 3 distilled water washing steps, where each step used 300 mL of distilled water. The resulting solid contained less than 0.1% residual sodium. The precipitate was dried at 393 K for 4 hours, then ground to a fine powder.

Potassium was impregnated with using the incipient wetness impregnation method. In this method a 2 M solution of potassium carbonate was prepared, then sprayed on to the solid iron and zinc complex while blending via a shake table. This was then calcined at 623 K for 6 hours. The resulting catalyst was $Na_{0.6}K_4Fe_{100}Zn_{16}O_y$.

II. $A_aB_bFe_{100}X_e$ catalyst preparation: Mined magnetite was ground to 0.25 particle size was impregnated with 5 wt % potassium with respect to iron, using the incipient wetness impregnation method. The impregnation was done with a potassium carbonate solution using enough distilled water to meet 0.2 gram water per gram of magnetite. The impregnation step was carried out dropwise on an ultrasonic bath. After the solution was fully added to the magnetite, the slurry was left in the ultrasonic bath for 10 minutes. It was then dried in an oven at 393 K for 4 hours, then calcined for 6 hours at 623 K. the resulting catalyst was a $Fe_{100}K_5$ III. $A_aB_bFe_{100}X_e$ catalyst preparation: A solution of Fe and Co metals was prepared using metal nitrates as the precursors and a base solution of sodium carbonate at a 2.4 molar equivalent to the metal nitrates was prepared at 0.5 M concentration.

Enough water to submerge the stirrer was added to a 2 L round bottom flask and heated to 343 K while continuously stirring. The metal and base solutions were transferred to the round bottom flask via peristaltic pump for parallel addition, with targeted flow rates so that the metal solution was completely added with half of the base solution over approximately 1 hour. The temperature was then increased to 353 K for 1 hour of aging. After an hour, the mixture was allowed to cool to room temperature before re-heating it to 343 K. The remaining base solution was added over the course of an hour, and the resulting slurry was aged for another hour at 353 K.

The precipitate was vacuum filtered using a 0.25 micro filter. The product was then washed 3 times and blended using approximately 300 mL water and filtered at each step to remove excess sodium to less than 0.1%. The resulting precipitate was dried at 393 K for 4 hours before grinding it to a fine powder and calcining for 6 hours at 623 K. The resulting catalyst was $Fe_{100}Co_{14}K_1$

Example 8: General Procedure for Conversion of $CO_2$ to Paraffins

Paraffin formation from $CO_2$ and hydrogenation is carried out in a fixed bed flow reactor. The flow reactor is loaded with 1 kg of CoRu/In on alumina catalyst. The catalyst is reduced in situ in a hydrogen environment at 250° C. for 2 hours. The reactor is heated to 250° C. after pretreatment. A feed mixture of 80% hydrogen and 20% $CO_2$ is introduced to the reactor at 500 psi and a gas hourly space velocity of 9,000 $h^{-1}$. The $CO_2$ is converted into a mixture of paraffins and olefins with a selective range of carbon chain numbers ($C_6$-$C_{40}$).

Example 9: Exemplary Procedure I for Conversion of $CO_2$ to Paraffins

Catalyst made by the method from Example 7, e.g., $Na_{0.6}K_4Fe_{100}Zn_{16}O_y$ was granulated to 40-60 mesh size and pretreated with $H_2$ at 623K, 150 PSIG, GHSV 1200 for 5 hours. It was later conditioned with syngas (H2/CO=2), at GHSV 600 at 623 K. The catalyst was then tested for $CO_2$ hydrogenation to produce a paraffinic portion of SAF with hydrocarbon range $C_{10}$-$C_{16}$. The $CO_2$ conversion to SAF was measured in a fixed bed reactor under the conditions of 623 K, GHSV 1500, 450 PSIG using feed gas $H_2$=72 mol %, $CO_2$=24 mol % and $N_2$=4 mol % as internal standard.

TABLE 9.1

Product distribution obtained by exemplary procedure I for conversion of $CO_2$ to paraffins.

| Catalyst Sample | Per-pass CO2 Conversion, % | Carbon Selectivity, % | | |
|---|---|---|---|---|
| | | CO | Total Aromatics | SAF Range Aromatics |
| Catalyst I | 30.2 | 8.1 | 22.7 | 26.4 |

Figure 5:
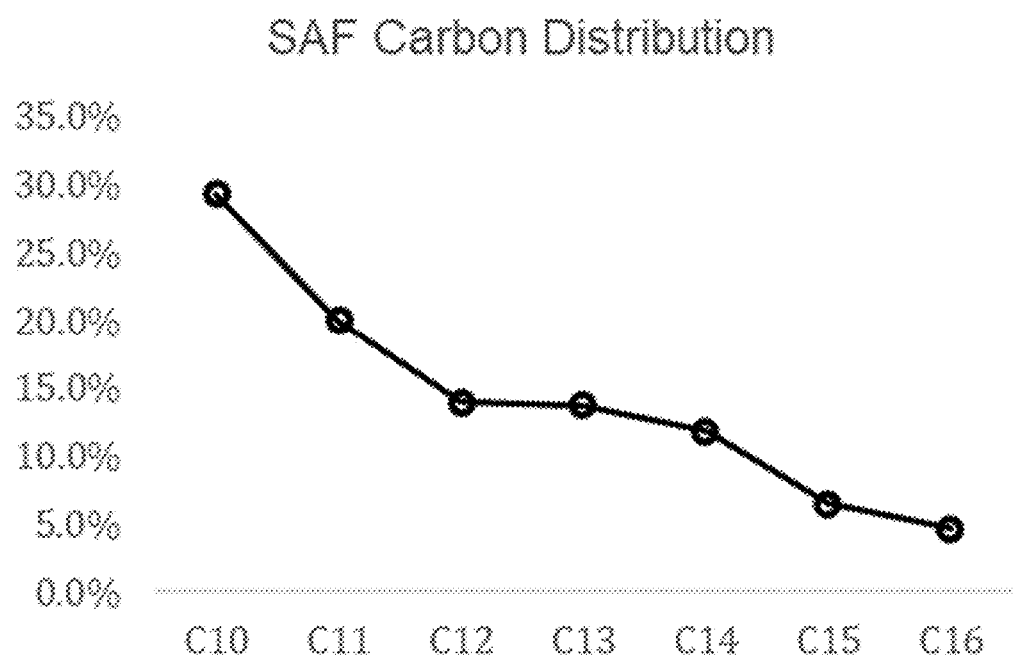
FIG. 5 is a plot showing the carbon number distribution of the $C_{10-16}$ product fraction from an exemplary $CO_2$-to-paraffins process of the disclosure.

The higher molecular weight products in the SAF product range ($C_{10}$-$C_{16}$) were analyzed for Carbon type distribution. The results are summarized in FIG. 5, and the distribution per carbon number is summarized in Table 9.2 below, where others include isoparaffins and cycloparaffins.

TABLE 9.2

$C_{10}$-$C_{16}$ hydrocarbon distribution obtained by exemplary procedure I for conversion of $CO_2$ to paraffins.

| | % | |
|---|---|---|
| | Olefin | Paraffin |
| $C_{10}$ | 57.7 | 42.3 |
| $C_{11}$ | 2.4 | 97.6 |
| $C_{12}$ | 2.9 | 97.1 |
| $C_{13}$ | 49.9 | 50.1 |
| $C_{14}$ | 14.7 | 85.3 |
| $C_{15}$ | 2.7 | 97.5 |
| $C_{16}$ | 29.8 | 70.2 |

Example 10: Exemplary Procedure II for Conversion of $CO_2$ to Paraffins

Catalyst made by the method from Example 7, e.g., $Fe_{100}K_5$ was granulated to 40-60 mesh size and pretreated under $H_2$ at 150 PSIG at 623K and GHSV 400 for 10 hours. After the hydrogen treatment the $CO_2$ conversion to SAF was carried out in a fixed bed reactor under the conditions 623K, GHSV 1500, 450 PSIG using feed gas $H_2$=63 mol %, $CO_2$=23 mol % and $N_2$=4 mol % as internal standard.

TABLE 10.1

Product distribution obtained by exemplary procedure II for conversion of $CO_2$ to paraffins.

| Catalyst Sample | Per-pass CO2 Conversion, % | Carbon Selectivity, % | | |
|---|---|---|---|---|
| | | CO | Total $C_{5+}$ | SAF Range hydrocarbons |
| Catalyst II | 38.6 | 12.5 | 50.6 | 68.1 |

Figure 6:
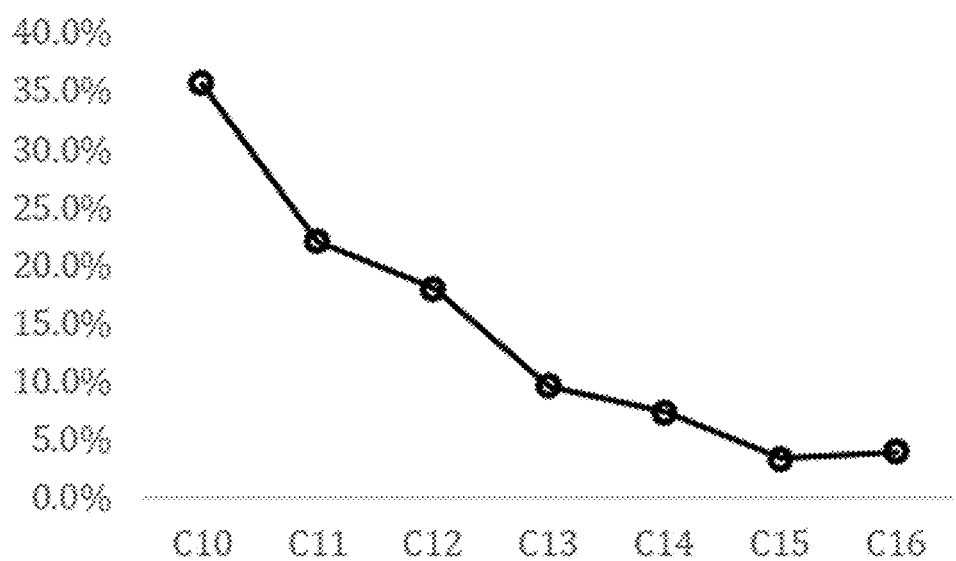
FIG. 6 is a plot showing the carbon number distribution of the $C_{10-16}$ product fraction from an exemplary $CO_2$-to-paraffins process of the disclosure.

The higher molecular weight products in the SAF product range ($C_{10}$-$C_{16}$) were analyzed for Carbon type distribution. The results are summarized in FIG. 6, and the distribution per carbon number is summarized in Table 10.2., below, where others include isoparaffins and cycloparaffins.

TABLE 10.2

$C_{10}$-$C_{16}$ hydrocarbon distribution obtained by exemplary procedure II for conversion of $CO_2$ to paraffins.

| | % | |
|---|---|---|
| | Olefin | Paraffin |
| $C_{10}$ | 0.0 | 100.0 |
| $C_{11}$ | 0.0 | 100.0 |
| $C_{12}$ | 0.0 | 100.0 |
| $C_{13}$ | 64.3 | 35.6 |
| $C_{14}$ | 77.7 | 22.3 |
| $C_{15}$ | 0.0 | 100.0 |
| $C_{16}$ | 24.0 | 76.0 |

Example 11: Exemplary Procedure III for Conversion of $CO_2$ to Paraffins

Catalyst made by the method of example 7, e.g., $Fe_{100}Co_{14}K_1$ was granulated to 40-60 mesh size and pretreated under $H_2$ at 150 PSIG at 623 K and GHSV 200 for 5 hours. After the hydrogen treatment the catalyst was conditioned with syngas ($H_2$/CO=2) at 145 PSIG, 623 K and GHSV 600 for 1 hour. The $CO_2$ conversion to SAF was measured in a fixed bed reactor under the conditions 623 K, GHSV 1500, 450 PSIG using feed gas of $H_2$=63 mol %, $CO_2$=23 mol % and $N_2$=4 mol % as internal standard.

TABLE 11.1

Product distribution obtained by exemplary procedure III for conversion of $CO_2$ to paraffins.

| Catalyst Sample | Per-pass CO2 Conversion, % | Carbon Selectivity, % | | |
|---|---|---|---|---|
| | | CO | Total $C_{5+}$ | SAF Range hydrocarbons |
| Catalyst III | 42.6 | 10.5 | 7.9 | 73.0 |

Figure 7:
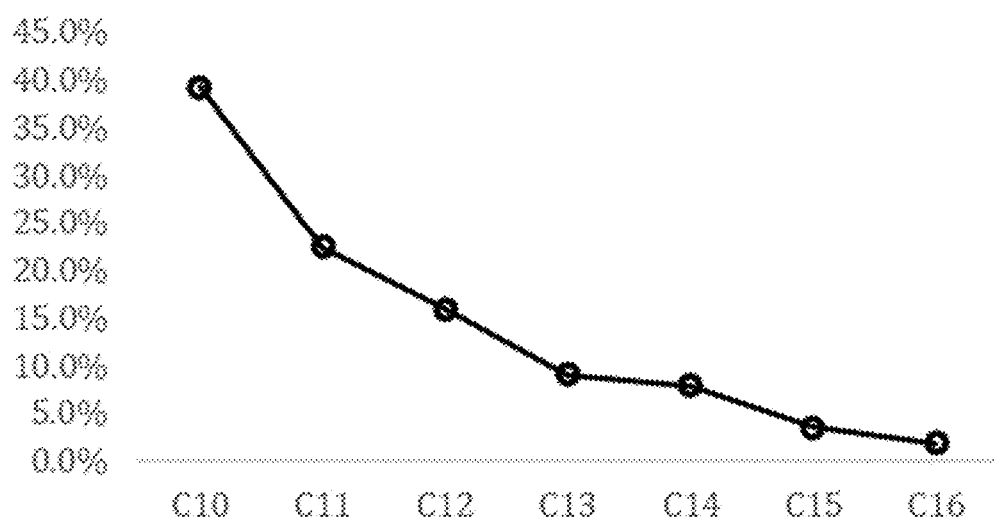
FIG. 7 is a plot showing the carbon number distribution of the $C_{10-16}$ product fraction from an exemplary $CO_2$-to-paraffins process of the disclosure.

The higher molecular weight products in the SAF product range ($C_{10}$-$C_{16}$) were analyzed for Carbon type distribution. The results are summarized in FIG. 7, and the distribution per carbon number is summarized in Table 11.2., below, where others include isoparaffins and cycloparaffins.

TABLE 11.2

$C_{10}$-$C_{16}$ hydrocarbon distribution obtained by exemplary procedure III for conversion of $CO_2$ to paraffins.

| | % | |
|---|---|---|
| | Olefin | Paraffin |
| $C_{10}$ | 45.1 | 54.9 |
| $C_{11}$ | 46.7 | 53.3 |
| $C_{12}$ | 45.7 | 37.9 |
| $C_{13}$ | 62.1 | 37.9 |
| $C_{14}$ | 65.6 | 34.4 |
| $C_{15}$ | 58.3 | 41.7 |
| $C_{16}$ | 0.0 | 100.0 |

Example 12: General Procedure for Separation of Target Range Hydrocarbons

A feed mixture of 50% $CO_2$-to-paraffins products (e.g., from Example 3) and 50% $CO_2$-to-aromatic products (e.g., from Example 2) is introduced into a distillation system under ambient pressure N₂ atmosphere. The fraction cut of 150° C.-250° C. is collected.

Example 13: General Procedure for Hydro-Isomerization of $CO_2$ to SAF Products The collected fraction from the separation step (e.g., from Example 4) is fed into a hydro-isomerization reactor loaded with 1 kg of Pt on beta-zeolite catalyst (0.5 wt % Pt). The reaction is carried out at 750 psi, with a mole ratio of hydrogen over hydrocarbons set at 500, and a liquid weight hourly space velocity of 1.0 $h^{-1}$. The fraction is converted into a mixture of saturated n-paraffin, iso-paraffin, aromatics, and cyclo-paraffin with a selective range of carbon chain number between $C_8$ and $C_{15}$.

Example 14: Exemplary Procedure for Hydrogenation and Hydrodeoxygenation

Platinum impregnated on alumina (0.5 wt % Pt) and palladium on carbon (1 wt % Pd) was loaded into a hydroisomerization fixed bed reactor. The catalyst was pretreated with hydrogen at 600 psig at 100° C. for 2 hours and then 300° C. for 4 hours with a GHSV of 3000. The liquid was fed in with a WHSV of 1, with a liquid/hydrogen volume ratio of 50. The resulting liquid was collected to give full conversion of olefins and oxygenate to paraffins and 10% cracking products from the process.

Example 15: Exemplary Procedure for Hydro-Isomerization of Paraffinic SAF

Platinum impregnated on SAPO-11 (0.2 wt % Pt) was loaded into a hydro-isomerization fixed bed reactor. The catalyst was pretreated with hydrogen at ambient pressure at 100° C. for 2 hours and then 250° C. for 12 hours. The liquid was fed in with a WHSV of 1, with a liquid/hydrogen volume ratio of 10. The resulting liquid was collected to give 65% conversion of normal paraffins to iso-paraffins and 10% cracking products from the process.

Example 16: General Procedure for Hydrocracking

The collected fraction from the separation step (e.g., from Example 4) is fed into a hydrocracking reactor loaded with 1 kg of Pt on Y zeolite catalyst (0.5 wt % Pt). The reaction is carried out at 750 psi, with a mole ratio of hydrogen over hydrocarbons set at 20, and a liquid weight hourly space velocity of 1.0 $h^{-1}$. The fraction is converted into a mixture of saturated n-paraffin, iso-paraffin, aromatic, and cyclo-paraffin with a selective range of carbon chain number between $C_8$ and $C_{15}$.

Example 17: Mixing Jet Fuel from Aromatic and Paraffin SAF

I. 160 gallons of the paraffin fuel mixture is mixed with 120 gallons of the aromatic fuel mixture. Among the 160 gallons of the paraffinic fuel mixture, 100 gallons are iso-paraffins, and 60 gallons are n-paraffins, ensured by controlling the hydro-isomerization conditions of paraffins. Among the 120 gallons of aromatic fuel mixture, 80 gallons are cyclo-paraffins, and 40 gallons are aromatics by controlling the aromatic hydrogenation conditions. Hence, this exemplary blended jet fuel has the composition of:

n-paraffins: 21.4 v %
iso-paraffins: 35.7 v %
Cyclo-paraffins: 28.6 v %
Aromatics: 14.3 v %
Polycyclic aromatics <1 v %
Indanes and Tetralins <1 v %

II. 200 gallons of the paraffin fuel mixture was mixed with 200 gallons of the aromatic fuel mixture. Among the 200 gallons of the paraffin fuel mixture, 120 gallons are iso-paraffins, and 80 gallons are normal paraffins by controlling the hydro-isomerization conditions of paraffins. Among the 200 gallons of aromatic fuel mixture, 160 gallons are cyclo-paraffins, and 40 gallons are aromatics by controlling the aromatic hydrogenation conditions. Hence, the blended jet fuel has the composition of:

n-paraffins: 20 v %
iso-paraffins: 30 v %
Cyclo-paraffins: 40 v %
Aromatics: 10 v %
Polycyclic aromatics <1 v %
Indanes and Tetralins <1 v %

Example 18: Exemplary Fuel Compositions

A renewable fuel was produced by contacting carbon dioxide and hydrogen gas with catalysts to produce a mixture of n-paraffins, isoparaffins, cycloparaffins, and aromatics. This product was analyzed by gas chromatography with mass spectrometry (GC-MS) and further characterized according to each of the standard methods specified in Table 18.1 below.

TABLE 18.1

Analysis results for exemplary fuel composition

| Analysis | Method | Value |
| --- | --- | --- |
| Density | ASTM D4052 | 0.78 kg/L |
| Flash Point | ASTM D93 | 42° C. |
| Total Acidity | ASTM D3242 | 0.07 mg KOH/g |
| Total Sulfur | ASTM D2622 | 0.000 mass % |
| Sulfur Mercaptan | ASTM D3227 | 0.00 mass % |
| Freeze Point | ASTM D5972 | −51° C. |
| Heat of Combustion | ASTM D4809 | 43.4 MJ/kg |
| Smoke Point | ASTM D1322 | 36 mm |
| Viscosity | ASTM D445 | 3.2 mm²/s at −20° C. |
| Filter Pressure Drop | ASTM D3241 | 0 mm Hg |
| Tube Deposit Rating | ASTM D3241 | 1 VTR Color Code |
| Lubricity | ASTM D5001 | 0.52 mm WSD |
| n-Paraffins | GC-MS | 47.7% |
| Isoparaffins | GC-MS | 8.8% |
| Cycloparaffins | GC-MS | 29.0% |
| Aromatics | GC-MS | 14.5% |

Example 19: Comparison of Aviation Fuel Produced by the Disclosed Methods with Traditional Aviation Fuel A comparison of Synthetic Jet A with traditional (petroleum-based) Jet A will be carried out in a turbojet engine. The two fuels will be tested consecutively using the same engine, instrumentation and test cell. The engine will first be run on Jet A+5% oil mix and will be fed from a temporary nitrogen pressured 2 gallon liquid dispensing tank. The container and fuel lines will be drained and replaced with the synthetic jet fuel+5% oil mix and the test will be repeated. The engine will be run at multiple speeds and will be held at each point for 1.5 minutes to reach thermal equilibrium. The last 20 seconds of each hold will be averaged as data points.

Start time, engine speed, and temperature will also be compared. After running a throttle hook to measure performance the engine will be shut down and allowed to cool for 15 minutes. During the cooling period the battery will be recharged. After the 15 minutes the engine will be started and brought to idle. This process will be the same for each engine to eliminate known impacts on engine start performance.

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

The invention claimed is:

1. A system for the production of aviation fuel comprising:
    a first reduction gas feed;
    a first carbon source feed;
    a paraffin reactor comprising a reduction catalyst, said paraffin reactor having a first reduction gas feed inlet, a first carbon source inlet, and a paraffin product outlet, wherein the first reduction gas feed is coupled to the first reduction gas feed inlet, and the first carbon source feed is coupled to the first carbon source feed inlet;
    a second reduction gas feed;
    a second carbon source feed;
    an aromatic reactor comprising an aromatic catalyst, said aromatic reactor having a second reduction gas feed inlet, a second carbon source inlet, and an aromatic product outlet, wherein the second reduction gas feed is coupled to the second reduction gas feed inlet, and the second carbon source feed is coupled to the second carbon source feed inlet; and
    a blender having a paraffin product inlet, an aromatic product inlet, and a blended product outlet, wherein the paraffin product outlet from the paraffin reactor is coupled to the paraffin product inlet of the blender, and the aromatic product outlet from the paraffin reactor is coupled to the aromatic product inlet of the blender.

2. The system of claim 1, wherein the reduction catalyst comprises iron.

3. The system of claim 1, wherein the reduction catalyst comprises:
    iron;
    K, Li, Zr, Cs, Mg, Ca, or a combination thereof, at a molar ratio of from 0 to about 0.20 relative to iron;
    Au, Cu, Na, Cr, Al, Ga, Mn, or a combination thereof, at a molar ratio from 0 to about 0.60 relative to iron; and
    Zn at a molar ratio from 0 to about 0.50 relative to iron.

4. The system of claim 2, wherein the reduction catalyst further comprises:
    K, Cs, Mg, Ca, or a combination thereof, at a molar ratio of from 0 to about 0.20 relative to iron;
    Na, Cu, Cr, Mn, or a combination thereof, at a molar ratio of from 0 to about 0.60 relative to iron; and
    Co, Ru, Ni, or a combination thereof, at a molar ratio of from 0 to about 0.50 relative to iron;
    wherein the reduction catalyst comprises at least one element selected from K, Cs, Mg, Ca, Na, Cu, Cr, Mn, Co, Ru, or Ni.

5. The system of claim 3, wherein the iron is in the form of an iron oxide, and the iron oxide is magnetite ($Fe_3O_4$), hematite ($Fe_2O_3$), or a combination thereof.

6. The system of claim 1, wherein the aromatic catalyst comprises a mixed oxide component comprising iron, zinc, or a combination thereof; and
    a zeolite component comprising a zeolite.

7. The system of claim 6, wherein the mixed oxide component comprises:
    iron;
    Zn in a molar ratio of from 0 to about 0.50 relative to iron;
    Na, K, Cs, Mg, Ca, or a combination thereof, in a molar ratio of from 0 to about 0.10 relative to iron;
    Cu, Cr, Mn, or a combination thereof, in a molar ratio of from 0 to about 0.60 relative to iron; or
    any combination thereof;
    wherein the mixed oxide component comprises at least one element selected from Zn, Na, K, Cs, Mg, Ca, Cu, Cr, or Mn.

8. The system of claim 1, wherein the aromatic catalyst comprises a zeolite component comprising a zeolite and a modifier selected from Fe, Ga, Zn, or a combination thereof.

9. A method for the production of aviation fuel comprising:
    contacting a first reduction gas and a first carbon source gas with a reduction catalyst to afford a paraffin product mixture comprising one or more paraffins;
    contacting a second reduction gas and a second carbon source gas with an aromatic catalyst to afford an aromatic product mixture comprising one or more aromatics and/or cyclic paraffins;
    blending the paraffin product mixture and the aromatic product mixture to afford a crude product mixture.

10. The method of claim 9, wherein the reduction catalyst comprises iron.

11. The method of claim 10, wherein the reduction catalyst further comprises:
    K, Cs, Mg, Ca, or a combination thereof, at a molar ratio of from 0 to about 0.20 relative to iron;
    Na, Cu, Cr, Mn, or a combination thereof, at a molar ratio of from 0 to about 0.60 relative to iron; and
    Co, Ru, Ni, or a combination thereof, at a molar ratio of from 0 to about 0.50 relative to iron;
    wherein the reduction catalyst comprises at least one element selected from K, Cs, Mg, Ca, Na, Cu, Cr, Mn, Co, Ru, or Ni.

12. The method of claim 10, wherein the iron is in the form of an iron oxide, and the iron oxide is magnetite ($Fe_3O_4$), hematite ($Fe_2O_3$), or a combination thereof.

13. The method of claim 9, wherein the reduction catalyst comprises:
    iron;
    K, Li, Zr, Cs, Mg, Ca, or a combination thereof, at a molar ratio of from 0 to about 0.20 relative to iron;
    Au, Cu, Na, Cr, Al, Ga, Mn, or a combination thereof, at a molar ratio of from 0 to about 0.60 relative to iron; and
    Zn at a molar ratio from 0 to about 0.50 relative to iron.

14. The method of claim 9, wherein the aromatic catalyst comprises:
- a mixed oxide component comprising iron, zinc, or a combination thereof; and
- a zeolite component comprising a zeolite.

15. The method of claim 14, wherein the mixed oxide component comprises:
- iron; and
- Zn in a molar ratio of from 0 to about 0.50 relative to iron;
- Na, K, Cs, Mg, Ca, or a combination thereof, in a molar ratio of from 0 to about 0.10 relative to iron;
- Cu, Cr, Mn, or a combination thereof, in a molar ratio of from 0 to about 0.60 relative to iron; or
- any combination thereof;
- wherein the mixed oxide component comprises at least one element selected from Zn, Na, K, Cs, Mg, Ca, Cu, Cr, or Mn.

16. The method of claim 9, wherein the first reduction gas and the second reduction gas are independently selected from $H_2$, a hydrocarbon, synthesis gas, or from a gas that is, or is derived from, flare gas, waste gas, or natural gas.

17. The method of claim 9, wherein the first carbon source gas, the second carbon source gas, or both the first carbon gas source and the second carbon source gas is $CO_2$.

18. The method of claim 9, wherein the crude product mixture comprises $C_{9-15}$ hydrocarbons.

19. The method of claim 18, wherein the crude product mixture is substantially free of $C_1$-$C_5$ hydrocarbons.

20. The method of claim 9, wherein the aromatic catalyst comprises a zeolite component comprising a zeolite and a modifier selected from Fe, Ga, Zn, or a combination thereof.

\* \* \* \* \*

UNITED STATES PATENT AND TRADEMARK OFFICE
CERTIFICATE OF CORRECTION

| | | |
|---|---|---|
| PATENT NO. | : 12,018,221 B2 | Page 1 of 1 |
| APPLICATION NO. | : 18/514569 | |
| DATED | : June 25, 2024 | |
| INVENTOR(S) | : Lubo Zhou et al. | |

It is certified that error appears in the above-identified patent and that said Letters Patent is hereby corrected as shown below:

In the Claims

At Column 44, Claim number 5, Line number 12, please delete:
"The system of claim 3, wherein the iron is in the form"
And replace with:
-- The system of claim 2, wherein the iron is in the form --

Signed and Sealed this
Twentieth Day of August, 2024

Katherine Kelly Vidal
*Director of the United States Patent and Trademark Office*